US008307120B2

(12) United States Patent
Machida

(10) Patent No.: US 8,307,120 B2
(45) Date of Patent: Nov. 6, 2012

(54) RESOURCE INFORMATION MANAGING DEVICE, SYSTEM, METHOD, AND PROGRAM

(75) Inventor: Fumio Machida, Tokyo (JP)

(73) Assignee: NEC Corporation, Tokyo (JP)

( * ) Notice: Subject to any disclaimer, the term of this patent is extended or adjusted under 35 U.S.C. 154(b) by 147 days.

(21) Appl. No.: 12/281,971

(22) PCT Filed: Feb. 26, 2007

(86) PCT No.: PCT/JP2007/053481
§ 371 (c)(1),
(2), (4) Date: Sep. 5, 2008

(87) PCT Pub. No.: WO2007/105471
PCT Pub. Date: Sep. 20, 2007

(65) Prior Publication Data
US 2009/0077264 A1 Mar. 19, 2009

(30) Foreign Application Priority Data
Mar. 7, 2006 (JP) .................................. 2006-061385

(51) Int. Cl.
*G06F 15/16* (2006.01)
(52) U.S. Cl. ....................................................... 709/248
(58) Field of Classification Search ................... 709/248
See application file for complete search history.

(56) References Cited

U.S. PATENT DOCUMENTS

| 5,537,101 | A | * | 7/1996 | Nakajima et al. | ............... 368/47 |
| 7,461,069 | B2 | | 12/2008 | Ikegami | |
| 2002/0099452 | A1 | * | 7/2002 | Kawai | ............................. 700/16 |
| 2004/0210495 | A1 | * | 10/2004 | White | .............................. 705/28 |
| 2005/0182856 | A1 | * | 8/2005 | McKnett | ........................ 709/248 |
| 2005/0193277 | A1 | | 9/2005 | Horikawa et al. | |
| 2005/0256869 | A1 | | 11/2005 | Ikegami | |
| 2006/0034159 | A1 | * | 2/2006 | Sano | ................................ 368/47 |
| 2007/0192504 | A1 | * | 8/2007 | Moore | .......................... 709/232 |
| 2008/0126568 | A1 | * | 5/2008 | Otoshi et al. | ................... 709/248 |
| 2008/0244094 | A1 | * | 10/2008 | Rich et al. | ...................... 709/248 |

FOREIGN PATENT DOCUMENTS

JP 6041344 A 3/1985

(Continued)

OTHER PUBLICATIONS

David L. Mills "Internet Time Synchronization", [online], RFC 1305, Mar. 1992, IETF, [Searched on Feb. 28, 2005], Internet URL http://www.faqs.org/rfcs/1305.html.
Japanese Office Action dated Aug. 22, 2011 from the Japanese Patent Office in counterpart Japanese Patent Application No. 2008-505036.

*Primary Examiner* — Jason Recek
(74) *Attorney, Agent, or Firm* — Sughrue Mion, PLLC

(57) ABSTRACT

Resource information is managed chronologically even in a large-scale distributed system or an information terminal network where time synchronization is not established. A resource information collection device confirms if time synchronization is established with a resource information generation device when resource information is collected from the resource information generation device and, if time synchronization is not established, records a generation time, corrected based on the time of the resource information collection device, in the resource information. A resource information reference device confirms time synchronization with the resource information collection device when resource information in the resource information collection device is referenced and, if synchronization is not established, records a generation time, corrected based on the time of the resource information reference device, in the resource information.

15 Claims, 25 Drawing Sheets

FOREIGN PATENT DOCUMENTS

| | | |
|---|---|---|
| JP | 3-80797 A | 4/1991 |
| JP | 5-189385 A | 7/1993 |
| JP | 10228330 A | 8/1998 |
| JP | 2003-216457 A | 7/2003 |
| JP | 2004157739 A | 6/2004 |
| JP | 2005-235054 A | 9/2005 |
| JP | 2005-284520 A | 10/2005 |
| JP | 2005327053 A | 11/2005 |

\* cited by examiner

FIG.3 (STEP A11)

(STEP A12)

FIG.6 (STEP B11)

FIG.7 (STEP B12)

(STEP C11)

(STEP C12)

FIG.18

[PROCEDURE]

| MANAGEMENT TERMINAL TIME | MONITOR SERVER ;105a | MONITOR SERVER ;105b | MANAGEMENT TERMINAL ;104 |
|---|---|---|---|
| 15:01 | COLLECT RESOURCE INFORMATION ON SERVER 106a | | |
| 15:02 | COLLECT RESOURCE INFORMATION ON NW APPARATUS 106b | | |
| 15:03 | | COLLECT RESOURCE INFORMATION ON SERVER 106c | |
| 15:04 | | COLLECT RESOURCE INFORMATION ON SERVER 106d | |
| 15:05 | | | REFERENCE RESOURCE INFORMATION COLLECTED IN MONITOR SERVERS 105a AND 105b |

FIG.19

[EXPECTED DATA]

| TIME | INFORMATION |
|---|---|
| 15:01 | LATEST RESOURCE INFORMATION ON SERVER 106a |
| 15:02 | LATEST RESOURCE INFORMATION ON NW APPARATUS 106b |
| 15:03 | LATEST RESOURCE INFORMATION ON SERVER 106c |
| 15:04 | LATEST RESOURCE INFORMATION ON SERVER 106d |

FIG.20

[DATA (WITHOUT TIME CORRECTION)]

| TIME | INFORMATION |
|---|---|
| 15:01 | LATEST RESOURCE INFORMATION ON SERVER 106a |
| 15:00 | LATEST RESOURCE INFORMATION ON NW APPARATUS 106b |
| 15:08 | LATEST RESOURCE INFORMATION ON SERVER 106c |
| 15:09 | LATEST RESOURCE INFORMATION ON SERVER 106d |

FIG.21
[DATA (WITH TIME CORRECTION)]

(MONITOR SERVER 105a)

| TIME | INFORMATION |
|---|---|
| 15:01 | LATEST RESOURCE INFORMATION ON SERVER 106a |
| 15:02 | LATEST RESOURCE INFORMATION ON NW APPARATUS 106b |

(MONITOR SERVER 105b)

| TIME | INFORMATION |
|---|---|
| 15:08 | LATEST RESOURCE INFORMATION ON SERVER 106c |
| 15:09 | LATEST RESOURCE INFORMATION ON SERVER 106d |

FIG.23

[PROCEDURE]

| MANAGEMENT TERMINAL TIME | MONITOR SERVER ;105a | MONITOR SERVER ;105b | MANAGEMENT TERMINAL ;104 |
|---|---|---|---|
| 16:01 | COLLECT RESOURCE INFORMATION ON SERVER 106a | | |
| 16:02 | COLLECT RESOURCE INFORMATION ON NW APPARATUS 106b | | |
| 16:03 | | COLLECT RESOURCE INFORMATION ON SERVER 106c | |
| 16:04 | | COLLECT RESOURCE INFORMATION ON SERVER 106d | |
| 16:05 | | | REFERENCE RESOURCE INFORMATION COLLECTED IN MONITOR SERVERS 105a AND 105b |

FIG.24
[EXPECTED DATA]

| TIME | INFORMATION |
|---|---|
| 16:01 | LATEST RESOURCE INFORMATION ON SERVER 106a |
| 16:02 | LATEST RESOURCE INFORMATION ON NW APPARATUS 106b |
| 16:03 | LATEST RESOURCE INFORMATION ON SERVER 106c |
| 16:04 | LATEST RESOURCE INFORMATION ON SERVER 106d |

FIG.25

[DATA (WITH OFFSET CORRECTION)]

(MONITOR SERVER 105a)

| TIME | INFORMATION |
|------|-------------|
| 16:01 | LATEST RESOURCE INFORMATION ON SERVER 106a |
| 16:00 | LATEST RESOURCE INFORMATION ON NW APPARATUS 106b |

RESOURCE INFORMATION MANAGING DEVICE, SYSTEM, METHOD, AND PROGRAM

TECHNICAL FIELD

The present invention relates to a resource information management device, a resource information management system, a resource information management method, a resource information management program, and a resource information generation program, and more particularly to a resource information management device, a resource information management system, a resource information management method, a resource information management program, and a resource information generation program that chronologically manage distributed computer resource information.

BACKGROUND ART

In a distributed system environment in which many information devices and programs are connected via a wired network or a wireless network, the management of the system is complicated. Resource information such as a large amount of configuration information, performance information, status information, and log information, which are collected from the resources (information devices or programs) configuring the distributed system, must be managed. In particular, to determine an appropriate control for system management, it is essential to accurately keep track of the current system status from the collected information. To do so, it is necessary to chronologically arrange the information, generated by individual resources, for identifying the causality relationship of generated events and numerical changes.

Patent Document 1 discloses an error log collection analysis agent system that, designed for identifying the causes of failures that are generated in an operation system, collects log information output by the products of multiple vendors when failures are generated, arranges them chronologically, arranges the log information according not to the criterion of the importance defined for each product but to the criterion of the importance of the whole operation system, and generates a report on the primary causes of the generated failures and their countermeasures. Although this system points out the importance of chronologically managing the log information output by multiple different products, it is based on a prerequisite that the time synchronization is established in a distributed system. It is clearly specified that the system has the means for establishing time synchronization and, more specifically, it is thought that a possible system have a means using a technology such as NTP (Network Time Protocol; see Non-Patent Document 1).

However, in a large scale system where many computers are connected via the Internet for use in grid computing or in a system where a large number of portable terminals or chips are wirelessly connected for use in ubiquitous computing, it is essentially difficult to time-synchronize all the objects-to-be managed (termed herein "managed objects"). In such an environment, collected information cannot always be managed chronologically but, sometimes, the causality relationship (cause and effect) is reversed with the symptom that an incorrect judgment is made. To avoid such a problem, Patent Document 2 and Patent Document 3 disclose methods for chronologically managing log information or event data in a time-unsynchronized environment.

Patent Document 2 addresses the problem of chronological management of event trace data in a system of multiple, time-unsynchronized computers, and discloses a method for correcting event generation times using offset values indicating time differences among computers.

Patent Document 3 addresses the problem of collecting and analyzing logs generated when failures are generated in computers distributed across many countries and time zones, and discloses a method for correcting the times in the log information using the time difference between a log collecting device and a log-collected device, the time zone information, and the locale information.

Those methods address the problem of the chronological management of resource information in an environment where managed objects are not time-synchronized and the solve the problem by calculating the time difference between a managed object and an information collecting computer as an offset and correcting the information generation times using the offset.

However, in a continuously operating system environment, it is unpredictable when a time difference is generated and when another manager partially corrects the time. So, the offset value is not constant but may be always varied, meaning that the disclosed methods may incorrectly correct times using old offset values. In addition to this problem, it is difficult to provide one centralized management server for use in managing a large distributed system. For this reason, the hierarchical configuration or the distributed configuration (P2P (Peer to Peer) configuration) of management servers is used. For example, DNS (Domain Name System), which provides the name resolution service on the Internet, uses a hierarchical configuration for managing the system domain names around the world.

Therefore, the method for managing the offset values among all managed objects in a large scale system is not practical and, even when the management servers are in a multi-stage configuration, a mechanism for chronologically managing distributed information is necessary. It is also assumed that time is not managed for non-contact type resources such as wirelessly-connected small terminals or IC chips. For those managed objects, it is necessary for an information collection server to estimate information generation times.

Patent Document 1:
Japanese Patent Kokai Publication No. JP-P2003-216457A
Patent Document 2:
Japanese Patent Kokai Publication No. JP-P2005-235054A
Patent Document 3:
Japanese Patent Kokai Publication No. JP-P2005-284520A
Non-Patent Document 1:
David L. Mills "Internet Time Synchronization", [online], March 1992, IETF, [Searched on Feb. 28, 2005].

DISCLOSURE OF THE INVENTION

Problems to be Solved by the Invention

The disclosures of Patent Documents and Non-Patent Document described above are incorporated herein by reference thereto.

From the prior art technologies and the background, the following problems are known.

First, when the time difference differs among managed objects and the degree of difference varies during the operation in a time-unsynchronized distributed system, there is a problem in that the chronological management of resource information, collected from the managed objects, is difficult.

The reason is that an offset value, which is a time difference between a managed object and a management server, is not always correct and that the information cannot be arranged correctly in the chronological order by the offset-value-based time correction operation.

Second, in a system where managed objects not having the time synchronization function are included, there is a problem in that the chronological management of resource information, collected from the managed objects, is difficult. The reason is that the information, generated from a managed object not having the time synchronization function, may not have information-generation time or the information-generation time may be inaccurate and, so, the information on all the managed objects cannot be arranged chronologically.

Third, when multiple management servers are managed in a multi-stage configuration in a large-scale distributed system, there is a problem in that the chronological management of resource information on managed objects is difficult. The reason is that it is difficult to manage the time differences from all managed objects as offsets and that else the time difference among management servers configured in the multi-stage configuration cannot be ignored.

It is a first object of the present invention to provide a function to allow resource information, collected from managed objects, to be chronologically managed when the time difference differs among managed objects and the degree of difference varies during the operation in a time-unsynchronized distributed system.

It is a second object of the present invention to provide a function to allow resource information, collected from managed objects, to be chronologically managed in a system that includes managed objects that have no time synchronization function.

It is a third object of the present invention to provide a function to allow resource information on managed objects to be chronologically managed when multiple management servers are managed in a multi-stage configuration in a large scale distributed system.

Means to Solve the Problems

In a first aspect of the present invention, a resource information management device, which manages resource information, comprises a time correction unit that confirms time synchronization with a predetermined device when resource information from the predetermined device is collected or referenced and, if time synchronization is not established, records a generation time, corrected based on own time, in the resource information (mode 1).

In a second aspect of the present invention, a resource information management system comprises one or more resources each including code; one or more resource information generation devices each of which generates resource information generated by converting the code to data; one or more resource information collection devices each of which collects the resource information from the resource information generation device; and a resource information reference device that references the resource information from the resource information collection device wherein the resource information collection device comprises a first time correction unit that confirms time synchronization with the resource information generation device when resource information from the resource information generation device is collected and, if synchronization is not established, records a first generation time, corrected based on own time, in the resource information, and the resource information reference device comprises a second time correction unit that confirms time synchronization with the resource information collection device when resource information from the resource information collection device is collected and, if synchronization is not established, records a second generation time, corrected based on own time, in the resource information (mode 2).

In a third aspect of the present invention a resource information management method that manages resource information using a resource information management device comprises: a step of confirming time synchronization with a predetermined device when resource information from the predetermined device is collected or referenced; and a step of recording a generation time, corrected based on a time of a collecting or referencing device, in the resource information if synchronization is not established (mode 3).

A fourth aspect of the present invention is a resource information management program that causes a resource information management device, which manages (including collecting and referencing) resource information, to perform a process of confirming time synchronization with a predetermined device when resource information from the predetermined device is collected or referenced; and a process of recording a generation time, corrected based on a time of a collecting or referencing device, in the resource information if synchronization is not established (mode 4).

In a fifth aspect of the present invention, a resource information generation program causes a resource information generation device, which generates resource information, to perform: a process of generating resource information, created by converting code included in resources to data, when request information, which is a request for resource information, is received; a process of confirming a time when the resource information is provided and recording the resource information with the time as a providing time; and a process of providing the resource information to a device from which the request information was sent (mode 5).

The following describes possible modes in each aspect of the present invention.

In the first aspect (mode 1), the predetermined device is a device that has a clocking function and, at the same time, generates or collects resource information (mode 1-2).

In the first aspect (mode 1), the resource information management device further comprises a clocking unit that measures a sending time when request information, which requests the predetermined device to send resource information, is sent, and measures a receiving time when resource information from the predetermined device is received, wherein the time correction unit is configured: to determine if time synchronization is established with the predetermined device when the resource information includes a providing time of the predetermined device, using the sending time, the receiving time, and the providing time; to calculate a corrected generation time, if synchronization is not established and a generation time is included in the resource information, by subtracting a time, elapsed from the generation time to the providing time, from an intermediate value between the sending time and the receiving time; and to record the corrected generation time in the resource information (mode 1-3).

In the first aspect (mode 1), the time correction unit is configured: to determine if time synchronization is established with the predetermined device when the resource information includes the providing time of the predetermined device, using the sending time, the receiving time, and the providing time; to calculate a corrected generation time as an intermediate value between the sending time and the receiving time if synchronization is not established and the generation time is not included in the resource information; and to record the corrected generation time in the resource information (mode 1-4).

In the first aspect (mode 1), the predetermined device is a resource information generation device that does not have a clocking function (mode 1-5).

In the first aspect (mode 1), the resource information management device further comprises a clocking unit that measures a sending time when request information, which requests the predetermined device to send resource information, is sent, and measures a receiving time when resource information from the predetermined device is received; wherein the time correction unit calculates a corrected generation time as an intermediate value between the sending time and the receiving time if the resource information does not include a providing time of the predetermined device, and records the corrected generation time in the resource information (mode 1-6).

In the second aspect (mode 2), the resource information collection devices comprise: a first resource information collection device and a second resource information collection device; and a first time correction unit of the first resource information collection device confirms time synchronization with the second resource information collection device when resource information is collected from the second resource information collection device and, if time synchronization is not established, records a third generation time, corrected based on own time, in the resource information (mode 2-1).

In the second aspect (mode 2), the resource information generation devices comprise one or both of a first resource information generation device that has a clocking function and a second resource information generation device that has no clocking function (mode 2-2).

In the third aspect (mode 3), the resource information management method further comprises: a step of measuring a sending time when request information, which requests the predetermined device to send resource information, is sent; a step of sending the request information; and a step of measuring a receiving time when resource information is received from the predetermined device; wherein in the step of confirming time synchronization, if the resource information includes a providing time of the predetermined device, it is determined if time synchronization with the predetermined device is established using the sending time, the receiving time, and the providing time; and the step of recording a generation time in the resource information comprises a step of calculating a corrected generation time, if time synchronization is not established and the resource information includes a generation time, by subtracting a time, elapsed from the generation time to the providing time, from an intermediate value between the sending time and the receiving time; and a step of recording the corrected generation time in the resource information (mode 3-1).

In the third aspect (mode 3), in the step of confirming time synchronization, if the resource information includes a providing time of the predetermined device, it is determined if time synchronization with the predetermined device is established using the sending time, the receiving time, and the providing time; and the step of recording a generation time in the resource information comprises a step of calculating a corrected generation time as an intermediate value between the sending time and the receiving time if time synchronization is not established and the resource information does not includes a generation time; and a step of recording the corrected generation time in the resource information (mode 3-2).

In the third aspect (mode 3), the resource information management method further comprises: a step of measuring a sending time when request information, which requests the predetermined device to send resource information, is sent; a step of sending the request information; and a step of measuring a receiving time when resource information from the predetermined device is received; wherein the step of recording a generation time in the resource information comprises: a step of calculating a corrected generation time as an intermediate value between the sending time and the receiving time if the resource information does not include a providing time of the predetermined device; and a step of recording the corrected generation time in the resource information (mode 3-3).

In the fourth aspect (mode 4), a resource information management program causes a resource information management device, which manages resource information, to perform a process of confirming time synchronization with a predetermined device when resource information from the predetermined device is collected or referenced; and a process of recording a generation time, corrected based on a time of a collecting or referencing device, in the resource information if synchronization is not established (mode 4-1).

In the fourth aspect (mode 4), the resource information management program further causes the resource information management device to perform a process of measuring a sending time when request information, which requests the predetermined device to send resource information, is sent; and a process of measuring a receiving time when resource information from the predetermined device is received; wherein in the process of confirming time synchronization, if the resource information includes a providing time of the predetermined device, the resource information management device is caused to determine if time synchronization with the predetermined device is established using the sending time, the receiving time, and in the providing time; and in the process of recording a generation time in the resource information, the resource information management device is caused to perform a process of calculating a corrected generation time, if time synchronization is not established and the resource information includes a generation time, by subtracting a time, elapsed from the generation time to the providing time, from an intermediate value between the sending time and the receiving time; and a process of recording the corrected generation time in the resource information (mode 4-2).

In the fourth aspect (mode 4), in the process of confirming time synchronization, if the resource information includes a providing time of the predetermined device, the resource information management device is caused to determine if time synchronization with the predetermined device is established using the sending time, the receiving time, and the providing time; and in the resource information management device, the step of recording a generation time in the resource information is caused to perform: a process of calculating a corrected generation time as an intermediate value between the sending time and the receiving time if time synchronization is not established and the resource information does not includes a generation time; and a process of recording the corrected generation time in the resource information (mode 4-3).

In the fourth aspect (mode 4), the resource information management program further causes the resource information management device to perform a process of measuring a sending time when request information, which requests the predetermined device to send resource information, is sent; and a process of measuring a receiving time when resource information from the predetermined device is received; wherein, in the process of recording a generation time in the resource information, the resource information management device is caused to perform: a process of calculating a corrected generation time as an intermediate value between the sending time and the receiving time if the resource information does not include a providing time of the predetermined device; and a process of recording the corrected generation time in the resource information (mode 4-4).

In the fourth aspect (mode 4), the resource information management program further causes the resource information management device to perform a process of presenting the resource information after the corrected generation time is recorded in the resource information (mode 4-5).

In the fourth aspect (mode 4), the resource information management program further causes the resource information management device to perform a process of storing the resource information after the corrected generation time is recorded in the resource information (mode 4-6).

Effects of the Invention

The present invention provides the following effects.

A first effect is that resource information collected from managed objects can be managed chronologically even when time differences vary among managed objects and the degree of differences change during the operation in a distributed system where times are not synchronized. As a result, resource information distributed in a wider system environment can be managed chronologically, and it becomes easy to identify the causes of failures and to detect the symptom of system abnormal conditions. The reason is that, when information is collected, time synchronization is confirmed, thereby correcting information generation times, without providing offsets.

A second effect is that resource information collected from managed objects can be managed chronologically in a system including managed objects having no time synchronization function. As a result, in a wireless terminal network or in the integrated monitoring terminal and server apparatuses, resource information can be managed chronologically, and it becomes easy to identify the causes of failures and to detect a symptom of system abnormal conditions. The reason is that, when information is collected, resource information generation times are recorded based on the time of an information collecting device.

A third effect is that resource information on managed objects can be managed chronologically when multiple management servers are managed in multiple stages in a large-scale distributed system. As a result, in a wide-area distributed network via the Internet, information can be selectively collected from a large number of managed objects for managing the information chronologically, and it becomes easy to identify the causes of failures and to detect the symptom of system abnormal conditions. The reason is that the manner of correcting the information generation time is solved between a collecting device and a collected device without restriction from the whole configuration.

BRIEF DESCRIPTION OF THE DRAWINGS

FIG. 18 is a table schematically showing one example of a processing procedure of the resource information management system in the first example of the present invention.

FIG. 19 is a table schematically showing one example of chronological data (expected data) expected when management terminals of the resource information management system in the first example of the present invention perform reference processing on monitor servers.

FIG. 20 is a table schematically showing one example of providing times (without time correction) of resource information in the resource information management system in the first example of the present invention.

FIG. 21 is a table schematically showing one example of providing times (with time correction) of resource information in the resource information management system in the first example of the present invention.

FIG. 23 is a table schematically showing one example of a processing procedure of the resource information management system in the first comparison example.

FIG. 24 is a table schematically showing one example of chronological data (expected data) expected when management terminals of the resource information management system in the first example of the present invention perform reference processing on monitor servers.

FIG. 25 is a table schematically showing one example of providing times (with offset correction) of resource information in the resource information management system in the first example of the present invention.

EXPLANATIONS OF SYMBOLS

Figure 1:
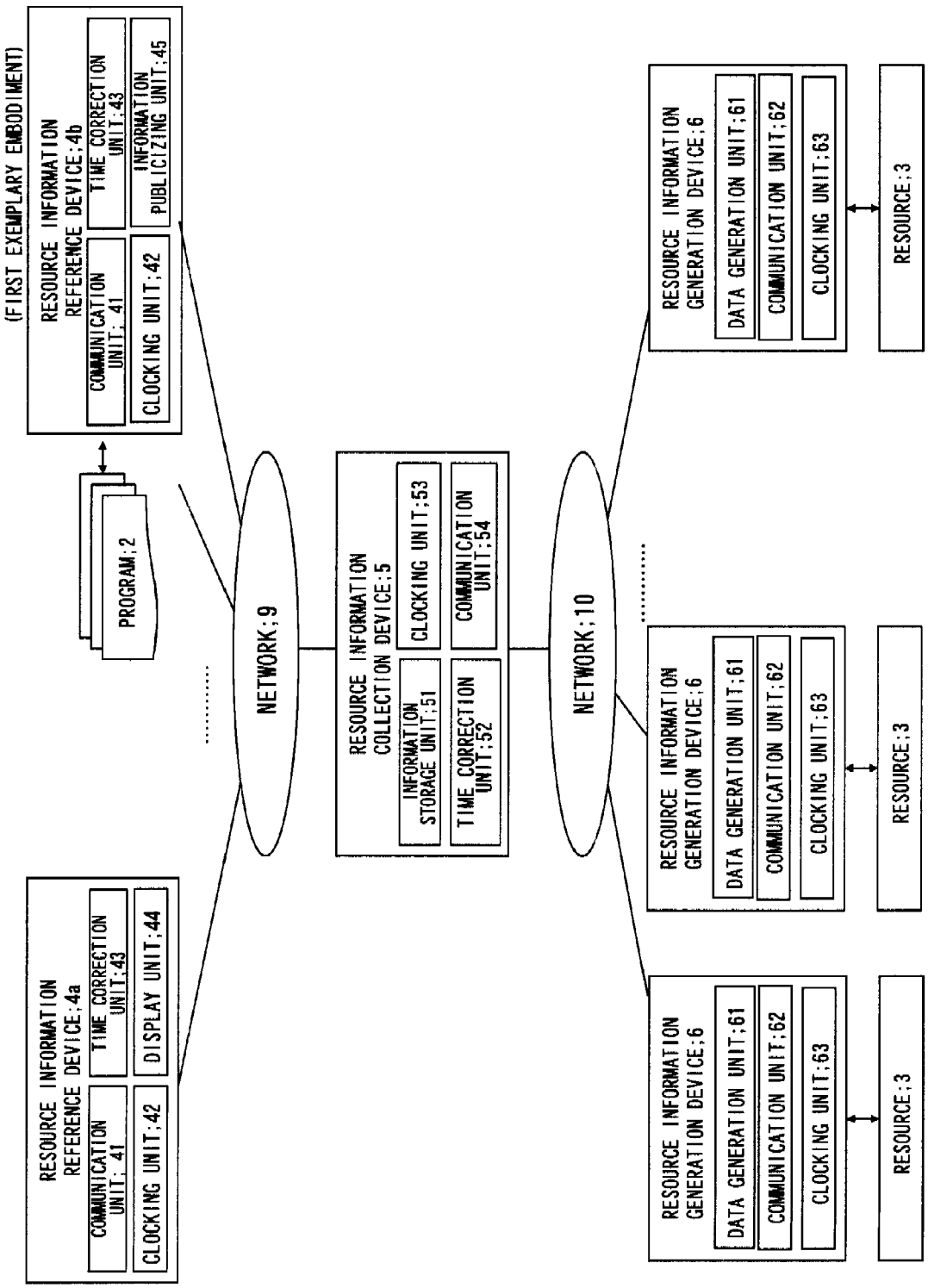
FIG. 1 is a block diagram schematically showing the configuration of a resource information management system in a first exemplary embodiment of the present invention.

2 Program
3 Resource
4,4a,4b Resource information reference device (resource information management device)
41 Communication unit
42 Clocking unit
43 Time correction unit
44 Display unit
45 Information publicizing unit
5,7 Resource information collection device (resource information management device)
51,71 Information storage unit
52,72 Time correction unit
53,73 Clocking unit
54,74 Communication unit
6,8 Resource information generation device
61,81 Data generation unit
62,82 Communication unit
63 Clocking unit
9,10,11 Network
104 Management terminal
105a,105b Monitor server
106a,106b,106d Server
106b NW apparatus Preferred Modes For Carrying Out The Invention (First Exemplary Embodiment)

A resource information management system in a first exemplary embodiment of the present invention will be described with reference to the drawings. FIG. 1 is a block diagram schematically showing the configuration of the resource information management system in the first exemplary embodiment of the present invention.

Referring to FIG. 1, the resource information management system in the first exemplary embodiment, which is a system that manages information (resource information) on resources 3, comprises the resources 3, resource information generation devices 6, a resource information collection device 5, resource information reference devices 4, and a program 2.

The resource 3 is hardware, software, contents, or data to be managed and is, typically, hardware such as a server, a PC, a mobile terminal, and home appliances, or software, contents, or data included in the hardware. The resource 3 has code (for example, identifier, generation time) that is the basis of resource information. This code sometimes includes in advance the generation time Tg indicating the time at which the resource 3 was generated such as that included in the log information or event information. The resource 3 may sometimes constitute the resource information generation device 6. The resource 3 can be connected to the resource information generation device 6 via a cable or wirelessly.

The resource information generation device 6 is a computer device that generates information (resource information) on the resource 3. The resource information generation device 6 is connected to the resource information collection device 5 via a network 10. In some cases, the hardware, software, contents, or data attached to the resource information generation device 6 may be resources 3. The resource information generation device 6, which operates based on the resource information generation program, comprises a data generation unit 61, a communication unit 62, and a clocking unit 63 as its major functional units.

When collection request information is received from the resource information collection device 5, the data generation unit 61 reads code from the resource 3 connected to the resource information generation device 6 via a cable or wirelessly and, based on the code that is read, generates resource information (sometimes including generation time Tg) generated by converting the configuration information, performance information, status information, and log information on the hardware, software, contents, or data on the resource 3 into data. The communication unit 62 receives the collection request information from the resource information collection device 5 and sends the generated resource information (including providing time Tp, sometimes including generation time Tg) to the resource information collection device 5. The clocking unit 63 measures the providing time Tp immediately before the generated resource information is provided (deemed providing time, deemed generation time) based on the clocking function and records the measured providing time Tp in the resource information (sometimes including the generation time Tg).

The resource information collection device 5 is a computer device that collects resource information from multiple resource information generation devices 6 and provides (supplies) resource information to multiple resource information reference devices 4 and is a device that manages the resource information. The resource information collection device 5 is connected to the resource information generation devices 6 via the network 10, and is connected to the resource information reference devices 4 via a network 9. The resource information collection device 5, which operates based on the resource information management program for collection, comprises an information storage unit 51, a time correction unit 52, a clocking unit 53, and a communication unit 54 as its major functional units.

The information storage unit 51 stores resource information. The time correction unit 52 determines if the acquired sending time Ts, information providing time Tp, and result receiving time Te are synchronized and, if it is determined that they are synchronized, stores the resource information (including providing time Tp, sometimes including generation time Tg) in the information storage unit 51. The synchronization determination method will be described later. If it is determined that they are not synchronized, the time correction unit 52 corrects the time based on the sending time Ts, providing time Tp, receiving time Te, and generation time Tg (providing time Tp is used if the generation time Tg is not included in the resource information), records a corrected generation time Tg', whose time is corrected, in the resource information, and stores the resource information in the information storage unit 51. The time correction method will be described later. Based on the clocking function, the clocking unit 53 measures and stores the sending time Ts that is the time immediately before the collection request information is sent (deemed sending time) and measures and stores the receiving time Te that is the time immediately after the resource information (including providing time Tp, sometimes including generation time Tg) from the resource information generation device 6. In addition, when the corresponding resource information is read from the information storage unit 51 based on reference request information, the clocking unit 53 measures the providing time Tp_1 that is the time immediately before the resource information that is read is provided (deemed providing time) based on the clocking time and records the measured providing time Tp_1 in the resource information. The communication unit 54 sends collection request information to the resource information generation device 6 and receives resource information (including providing time Tp, sometimes including the generation time Tg) from the resource information generation devices 6. The communication unit 54 also receives reference request information from the resource information reference devices 4 and sends resource information (including providing time Tp_1 and providing time Tp, sometimes including corrected generation time Tg' and generation time Tg) to the corresponding resource information reference device 4.

The resource information reference device 4 (4a, 4b) is a computer device used to reference resource information provided by the resource information collection device 5 and is a device that manages resource information. The resource information reference device 4a is a device that can provide resource information to a managing party (person). The resource information reference device 4b is a device that can provide resource information to the program 2 (program operating on a terminal connected to the resource information reference device 4b via cable or wirelessly) that manages and uses resource information. The resource information reference device 4(4a, 4b) is connected to the resource information collection device 5 via the network 9. The resource information reference device 4a, which operates based on the resource information management program for reference, comprises a communication unit 41, a clocking unit 42, a time correction unit 43, and a display unit 44 as its major functional units. The resource information reference device 4b, which operates based on a predetermined program, comprises the communication unit 41, clocking unit 42, time correction unit 43, and an information publicizing unit 45 as its major functional units.

The communication unit 41 sends reference request information to the resource information collection device 5 and receives resource information (including providing time Tp_1) from the resource information collection device 5. Based on the clocking function, the clocking unit 42 measures and stores a sending time Ts_2 that is the time immediately before reference request information is sent (deemed sending time), and measures and stores a receiving time Te_2 that is the time immediately after resource information (including providing time Tp_1) is received from the resource information collection device 5. The time correction unit 43 determines if the acquired sending time Ts_2, providing time Tp_1, and receiving time Te_2 are synchronized. The synchronization determination method will be described later. If it is determined that they are not synchronized, the time correction unit 43 corrects the time based on the sending time Ts_2, providing time Tp_1, receiving time Te_2, and generation time Tg'_1, and records a corrected generation time Tg'_2, whose time is corrected, in the resource information. The generation time Tg'_1 corresponds to the corrected generation time Tg', the generation time Tg is used when Tg' is not included in the resource information, and the providing time Tp is used when Tg is not included in the resource information. The time correction method will be described later. The display unit 44 displays the resource information (corrected resource information if the time is corrected) when the time correction unit 43 has determined that synchronization is established or after the time correction unit 43 has corrected the time. The information publicizing unit 45 publicizes (makes available for access) the resource information (corrected resource information if the time is corrected) when the time correction unit 43 has determined that synchronization is established or after the time correction unit 43 has corrected the time.

"Collection request information" is information used by the resource information collection device 5 to request the resource information generation device 6 to collect resource information, and the resource 3 from which information is to be collected is specified in the collection request information. "Reference request information" is information used by the resource information reference device 4 to request the resource information collection device 5 to reference the resource information, and the resource information to be referenced is specified in the reference request information.

Because the time is corrected in the first exemplary embodiment without depending on another time synchronization system or on an offset value used to manage time differences, the time synchronization processing unit such as that described in Patent Document 1 or the time offset table such as that described in Patent Document 3 is not included.

Next, the following describes the operation of the resource information management system in the first exemplary embodiment of the present invention.

Figure 2:
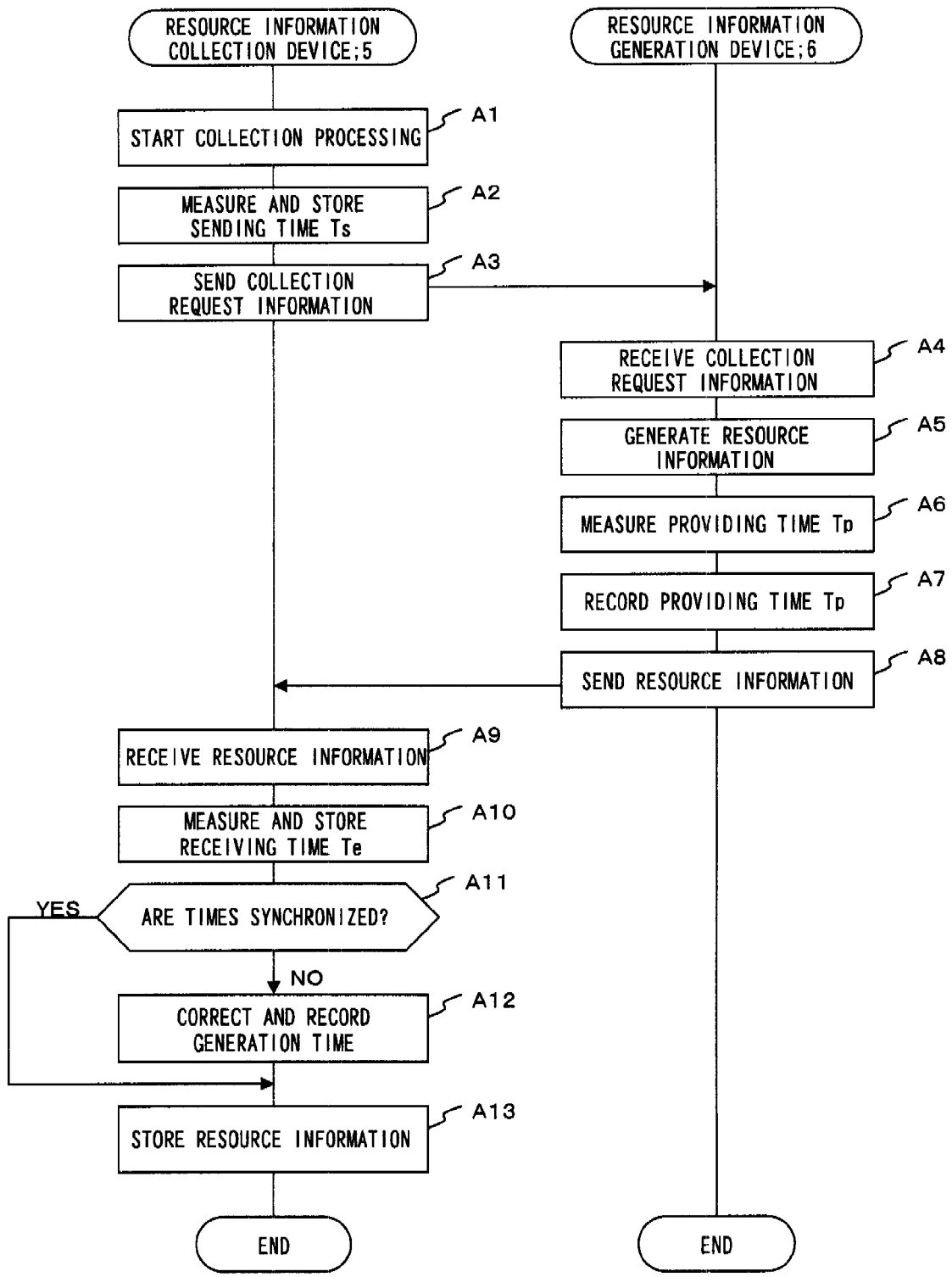
FIG. 2 is a flowchart schematically showing one example of information collection processing performed between a resource information collection device and a resource information generation device of the resource information management system in the first exemplary embodiment of the present invention.
Figure 3:
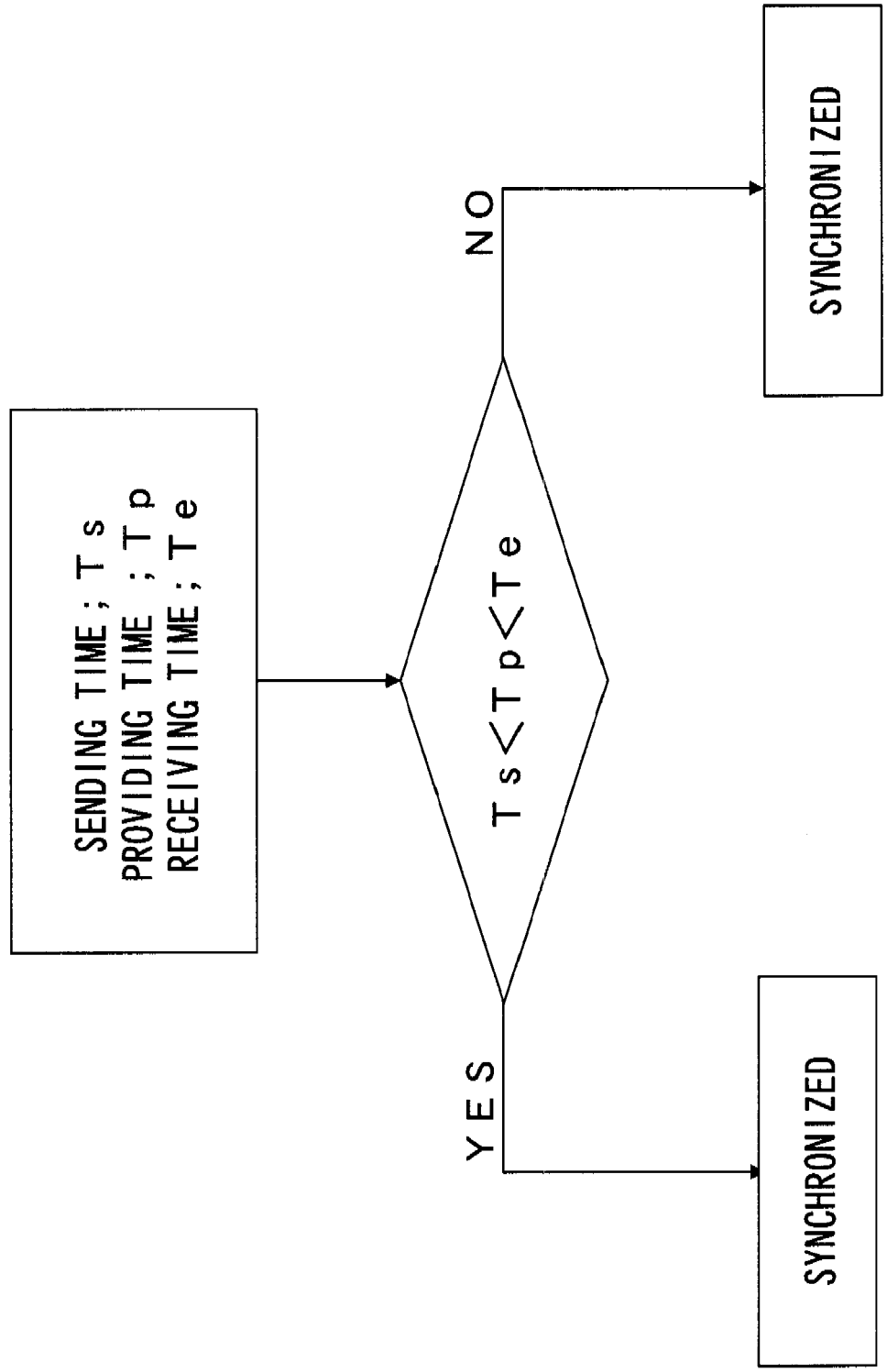
FIG. 3 is a flowchart schematically showing one example of synchronization determination processing of the resource information collection device in the resource information management system in the first exemplary embodiment of the present invention.
Figure 4:
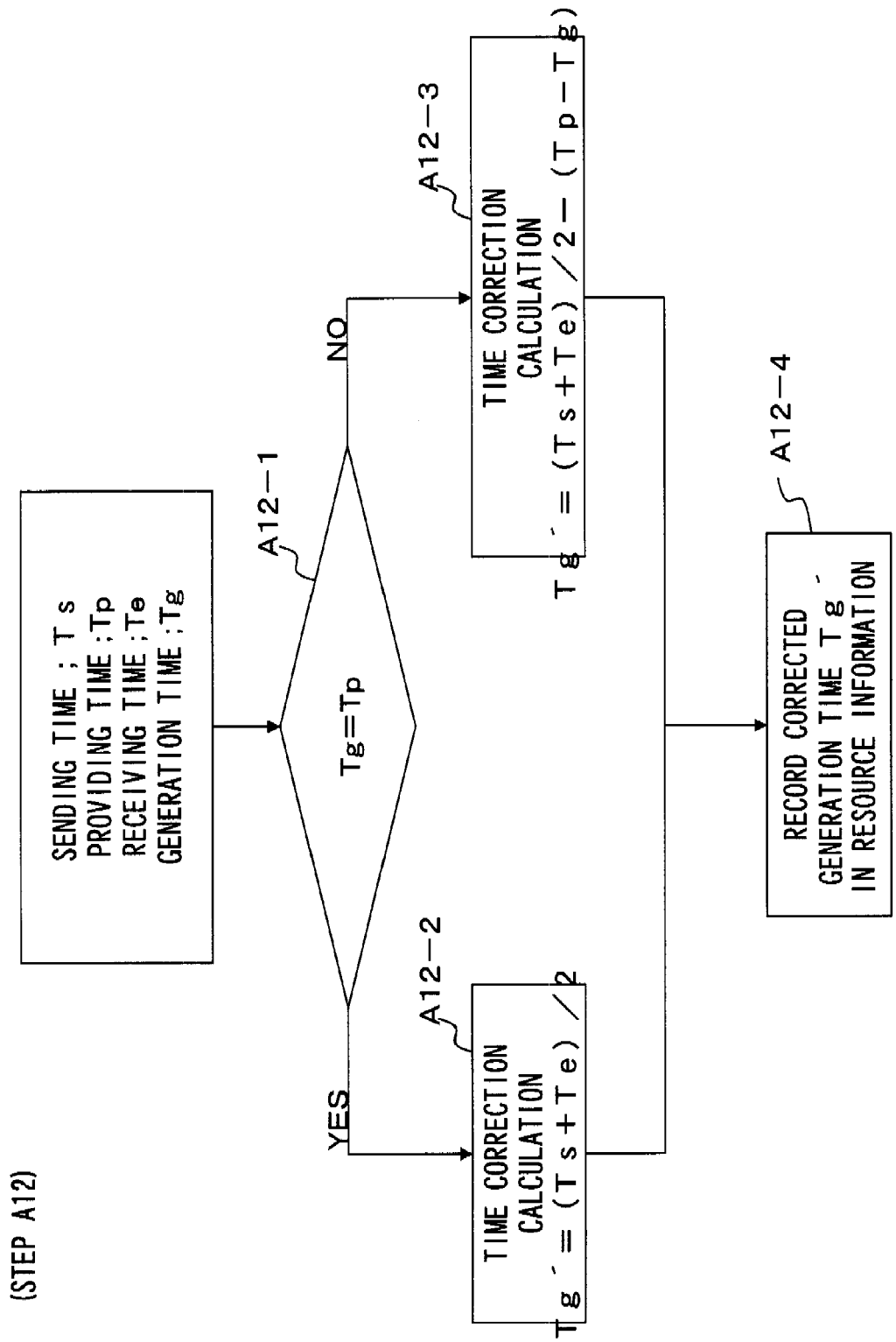
FIG. 4 is a flowchart schematically showing one example of time correction processing of the resource information collection device in the resource information management system in the first exemplary embodiment of the present invention.

First, the following describes the basic flow of information collection processing that is performed between one resource information collection device 5 and one resource information generation device 6 with reference to the drawings. FIG. 2 is a flowchart schematically showing one example of information collection processing performed between the resource information collection device and the resource information generation device of the resource information management system in the first exemplary embodiment of the present invention. FIG. 3 is a flowchart schematically showing one example of the synchronization determination processing of the resource information collection device in the resource information management system in the first exemplary embodiment of the present invention. FIG. 4 is a flowchart schematically showing one example of the time correction processing of the resource information collection device in the resource information management system in the first exemplary embodiment of the present invention. For the configuration of the resource information collection device 5 and the resource information generation device 6, see FIG. 1. The processing is performed based on the basic flow shown in FIG. 2 also when there are multiple resource information generation devices 6 and multiple resource information collection devices 5.

First, when resource information collection processing is started regularly or when reference request information is received from the resource information reference device 4, the resource information collection device 5 starts resource information collection processing (step A1). Next, immediately before collection request information is sent to the resource information generation device 6 (deemed sending time), the resource information collection device 5 causes the clocking unit 53 to measure the sending time Ts and stores the measured sending time Ts (step A2). Next, the resource information collection device 5 sends the collection request information to the resource information generation device 6 (step A3).

Next, the resource information generation device 6 receives the collection request information from the resource information collection device 5 (step A4). Next, the resource information generation device 6 causes the data generation unit 61 to access the resource 3 to be managed, to read the code of the resource 3 such as the configuration information and the status information, and to generate resource information that is data generated based on the code that has been read (step A5). For example, processing for outputting the configuration information to a text file in a form according to the schema of CIM (Common Information Model), processing for outputting the latest performance information to a binary file, and processing for converting the updated log to another log format are performed. The code of the resource 3, such as that of the log information or the event information, sometimes includes the generation time Tg at which the resource 3 itself was generated and, in that case, the generation time Tg is included in the generated resource information. Next, the resource information generation device 6 causes the clocking unit 63 to measure the providing time Tp immediately before the generated resource information is provided (deemed providing time, deemed generation time) (step A6). Next, the resource information generation device 6 records the providing time Tp in the resource information (step A7). When the generation time Tg is not included in the resource information, the providing time Tp is used instead of the generation time. Next, the resource information generation device 6 sends the information result (including providing time Tp, sometimes including generation time Tg) to the resource information collection device 5 (step A8).

Next, the resource information collection device 5 receives the resource information (including providing time Tp, sometimes including generation time Tg) from the resource information generation device 6 (step A9). Next, the resource information collection device 5 causes the clocking unit 53 to measure the receiving time Te that is the time immediately after receiving the resource information (deemed receiving time) and stores the receiving time Te (step A10).

Next, the resource information collection device 5 determines if the time is synchronized between the resource information collection device 5 and the resource information generation device 6 based on the sending time Ts and receiving time Te that are stored and the providing time Tp that is included in the resource information (step A11). The synchronization determination processing is performed as follows.

In the synchronization determination processing in step A11, the determination is made to see if the providing time Tp of the collected resource information is between the sending time Ts and the receiving time Te (see FIG. 3). If the times are synchronized, at least this condition is always satisfied. More accurately, though there is a time error caused by the time of communication between the resource information collection device 5 and the resource information generation device 6 and the time for generating the resource information, it is assumed that this error falls in a narrow range. If the error is large, the communication delay time and the information generation time should be measured in advance and the determination should be made by narrowing the allowable time range of the providing time Tp. Note that the method shown in FIG. 3 has advantages in that the generation time can be corrected even if the resource information generation device 6 has no function to measure the communication time and the information generation time.

If it is determined that the times are not synchronized (NO in step A11), the resource information collection device 5 uses the clocking function of the resource information collection device 5 to correct the generation time Tg and records the corrected generation time Tg in the resource information (step A12). The time correction processing is performed as follows.

In the time correction processing in step A12, the time correction processing (FIG. 4) of the generation time Tg is performed if it is determined as a result of the synchronization determination (FIG. 3) that the times are not synchronized. The time correction of the generation time Tg differs between the case in which the generation time Tg is included in the resource information as in the log data and the case in which the generation time Tg is not included in the resource information as in the configuration information and the performance information. Therefore, when the generation time Tg is not included in the resource information, the providing time Tp that is always included in the resource information is used as the generation time Tg. First, a determination is made if Tg=Tp is satisfied to identify the generation time Tg of the resource information (step A12-1). If Tg=Tp is satisfied (YES in step A12-1), it is judged that the resource information was generated between the sending time Ts and the receiving time Te as measured by the resource information collection device 5 and, so, an intermediate (or mid) value of Ts and Te is used as the corrected generation time Tg' (step A12-2). On the other hand, if Tg=Tp is not satisfied (NO in step A12-1), the period of time from the time the resource 3 itself was generated to the time the resource information was provided is calculated as "Tp−Tg" and the time that is "Tp−Tg" earlier than the estimated providing time of the resource information collection device 5 (intermediate time of Ts and Te in this case) is used as the corrected generation time Tg' (step A12-3). The calculated corrected generation time Tg' is recorded in the resource information (step A12-4). Similarly, though an error is generated also by the communication time or the information generation time, it is possible to increase the accuracy by measuring those values in advance. Note that the method shown in FIG. 4 has advantages in that the generation time can be corrected even if the resource information generation device 6 has no function to measure the communication time and the information generation time.

If the times are synchronized (YES in step A11) or when the correction of the information generation time (step A12) is finished, the resource information collection device 5 stores the resource information in the information storage unit 51 (step A13) and terminates the processing.

Because the resource information collection device 5 determines the generation time based on a time difference at the time the resource information is collected, there is no danger that an incorrect time correction is made for the information stored in the information storage unit 51 even if a time difference is generated or synchronization is established during the period of measurement. Because the resource information collection device 5 corrects the generation time Tg based on the time of the resource information collection device 5, the generation times (or corrected generation times) of resource information can be chronologically stored in the information storage unit 51 even when there are multiple managed objects having a time difference. Note that the accuracy depends on the synchronization determination method (see FIG. 3) and the generation time correction method (see FIG. 4).

Figure 5:
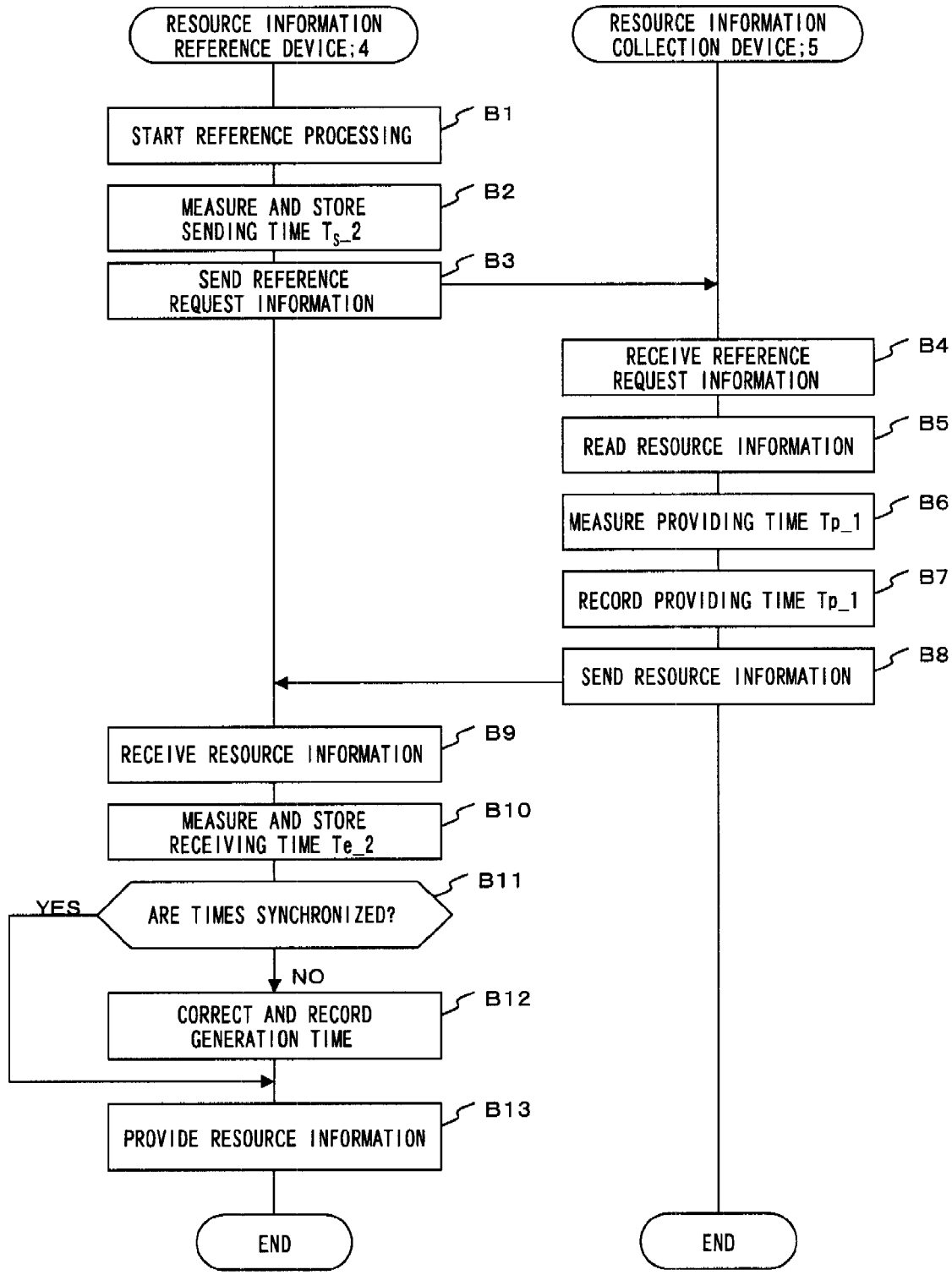
FIG. 5 is a flowchart schematically showing one example of processing performed between the resource information collection device and a resource information reference device in the resource information management system in the first exemplary embodiment of the present invention.
Figure 6:
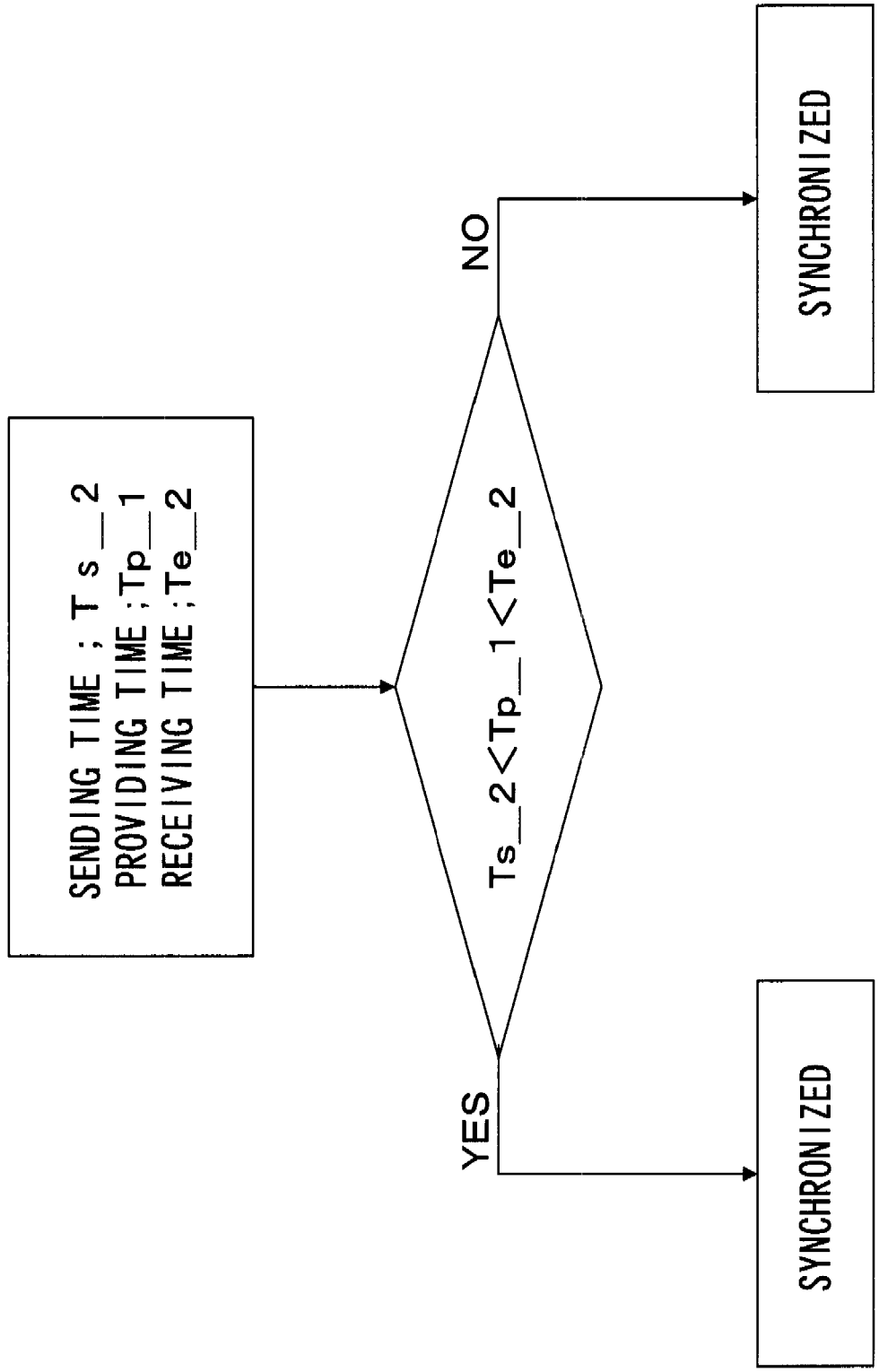
FIG. 6 is a flowchart schematically showing one example of synchronization determination processing of the resource information reference device in the resource information management system in the first exemplary embodiment of the present invention.
Figure 7:
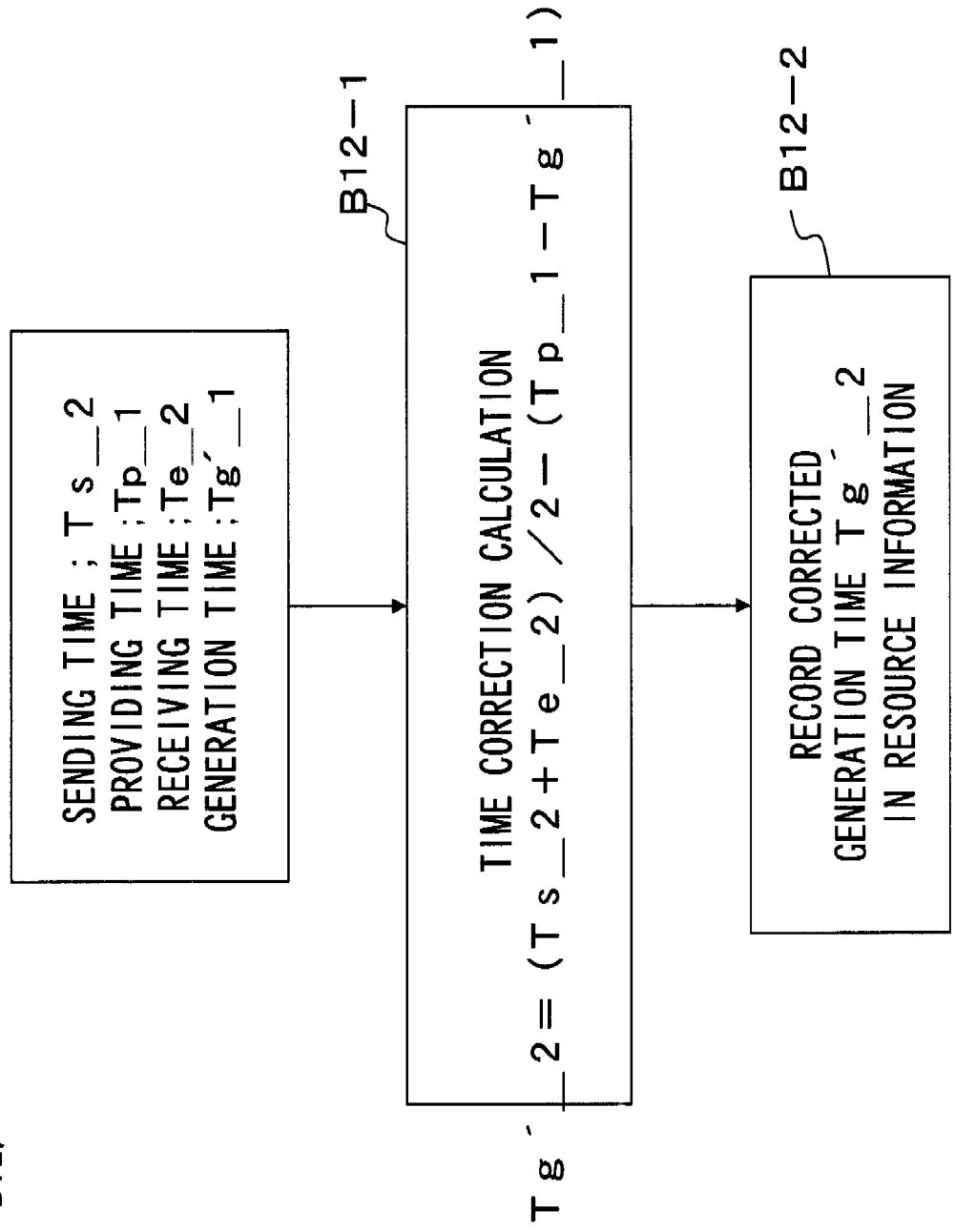
FIG. 7 is a flowchart schematically showing one example of time correction processing of the resource information reference device in the resource information management system in the first exemplary embodiment of the present invention.

Next, the following describes the basic flow of the processing that is performed between one resource information reference device 4 and one resource information collection device 5 with reference to the drawings. FIG. 5 is a flowchart schematically showing one example of processing performed between the resource information collection device and the resource information reference device in the resource information management system in the first exemplary embodiment of the present invention. FIG. 6 is a flowchart schematically showing one example of the synchronization determination processing of the resource information reference device in the resource information management system in the first exemplary embodiment of the present invention. FIG. 7 is a flowchart schematically showing one example of the time correction processing of the resource information reference device in the resource information management system in the first exemplary embodiment of the present invention. Note that the processing for referencing the information is performed according to the same procedure as that of the basic flow of the information collection processing shown in FIG. 2.

First, when information reference processing is started regularly or when a reference request is issued from a manager or the program 2, the resource information reference device 4 starts the reference processing (step B1). Next, the resource information reference device 4 causes the clocking unit 42 to measure the sending time Ts_2 immediately before the reference request information is sent to the resource information collection device 5 (deemed sending time) and stores the measured sending time Ts_2 (step B2). Next, the resource information reference device 4 sends the reference request information to the resource information collection device 5 (step B3).

Next, the resource information collection device 5 receives the reference request information from the resource information reference device 4 (step B4). Next, the resource information collection device 5 reads the resource information corresponding to the reference request information from the information storage unit 51 (step B5). Next, the resource information collection device 5 causes the clocking unit 53 to measure the providing time Tp_1 that is the time immediately before the resource information that has been read is provided (deemed providing time) (step B6). Next, the resource information collection device 5 records the measured providing time Tp_1 in the resource information (step B7). Next, the resource information collection device 5 sends the resource information to the resource information reference device 4 (step B8).

Next, the resource information reference device 4 receives the resource information from the resource information collection device 5 (step B9). Next, the resource information reference device 4 measures the receiving time Te_2 that is the time immediately after the resource information is received (deemed receiving time) and stores the receiving time Te_2 (step B10).

Next, the resource information reference device 4 determines if the time is synchronized between the resource information reference device 4 and the resource information collection device 5 based on the sending time Ts_2 and the receiving time Te_2 that are stored and the providing time Tp_1 that is included in the resource information (step B11). The time synchronization determination processing is performed by determining if the providing time Tp_1 stored in the resource information is between the sending time Ts_2 and the receiving time Te_2 (see FIG. 6).

If they are not synchronized (NO in step B11), the resource information reference device 4 corrects the generation time Tg'_1 (step B12). Referring to FIG. 7, in correcting the time, the period of time from the time the resource 3 itself was generated to the time the resource information was provided is calculated as "Tp_1−Tg'_1" and the time that is by "Tp_1−Tg'_1" earlier than the estimated providing time of the resource information reference device 4 (intermediate time of Ts_2 and Te_2 in this case) is set to the generation time Tg'_2 (step B12-1). The calculated corrected generation time Tg'_2 is recorded in the resource information (step B12-2). Meanwhile, the corrected generation time Tg' in the resource information is used for the generation time Tg'_1, the generation time Tg is used when the corrected generation time Tg' is not included in the resource information, and the providing time Tp is used when Tg is not included in the resource information.

If the times are synchronized (YES in step B11) or after step B12, the resource information reference device 4 directly provides (displays, publicizes) the information as the result (step B13) and terminates the processing.

Even if there is a time difference between the resource information reference device 4 and the resource information collection device 5, the above-described configuration allows a manager or another program 2 to reference the generation time in the resource information according to the time of the resource information reference device 4 and to chronologically keep track of the distributed resource information.

When the resource information is collected and referenced, the first exemplary embodiment is configured in such a way that the generation time of resource information is estimated and corrected according to the time of the resource information collection device 5 and the resource information reference device 4. So, even when there is a time difference among the resource information reference device 4, resource information collection device 5, and multiple resource information generation devices 6, the resource information reference device 4 can acquire all resource information chronologically.

In addition, instead of managing the time difference among devices as an offset, the time is measured at collection time and the information generation time is corrected only when the correction is required. So, even if the offset value is changed as a result of time synchronization or correction, the problem that data generated after the change is corrected by an incorrect offset value is not generated.

It is assumed that the time axis of data stored in information providing devices is consistent. More specifically, when the time of an information providing device is corrected, the generation time of data that is already stored must also be corrected.

(Second Exemplary Embodiment)

Figure 8:
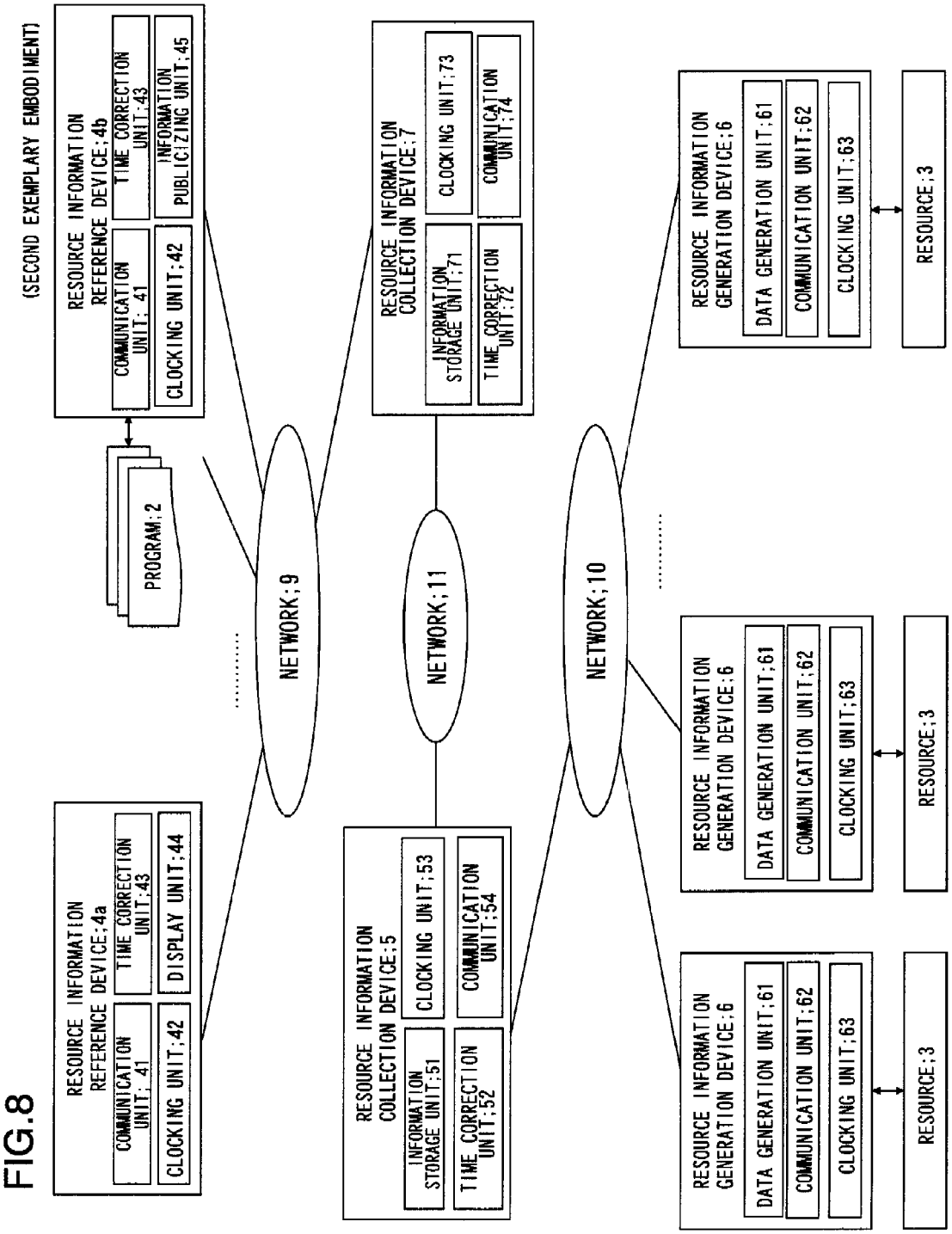
FIG. 8 is a block diagram schematically showing the configuration of a resource information management system in a second exemplary embodiment of the present invention.
Figure 9:
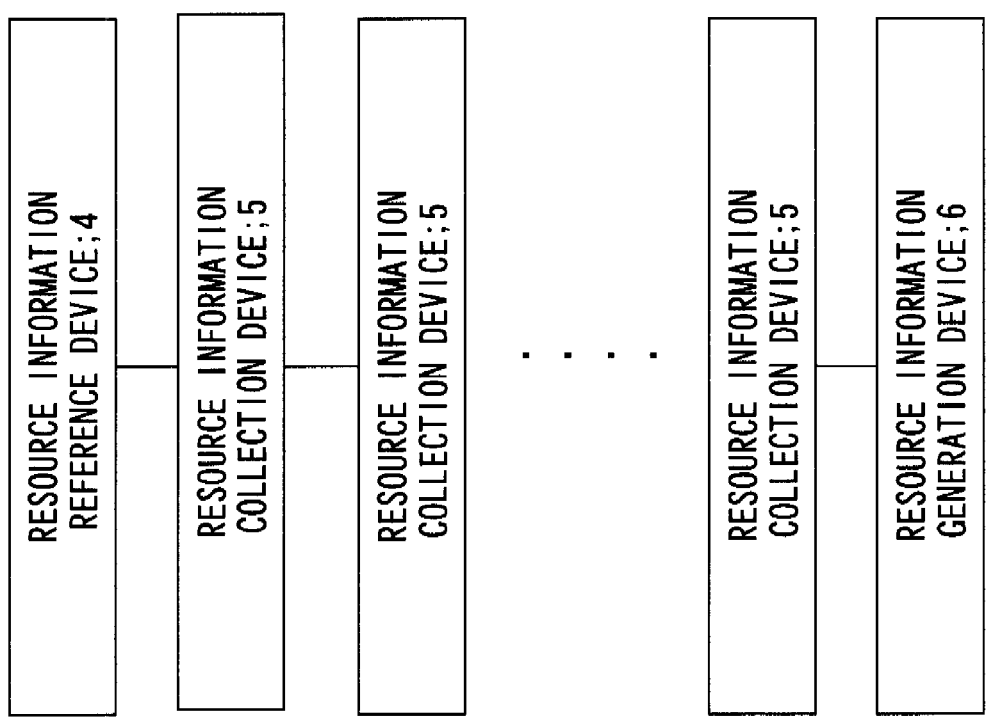
FIG. 9 is a block diagram schematically showing the series-type connection configuration of resource information collection devices in the resource information management system in the second exemplary embodiment of the present invention.
Figure 10:
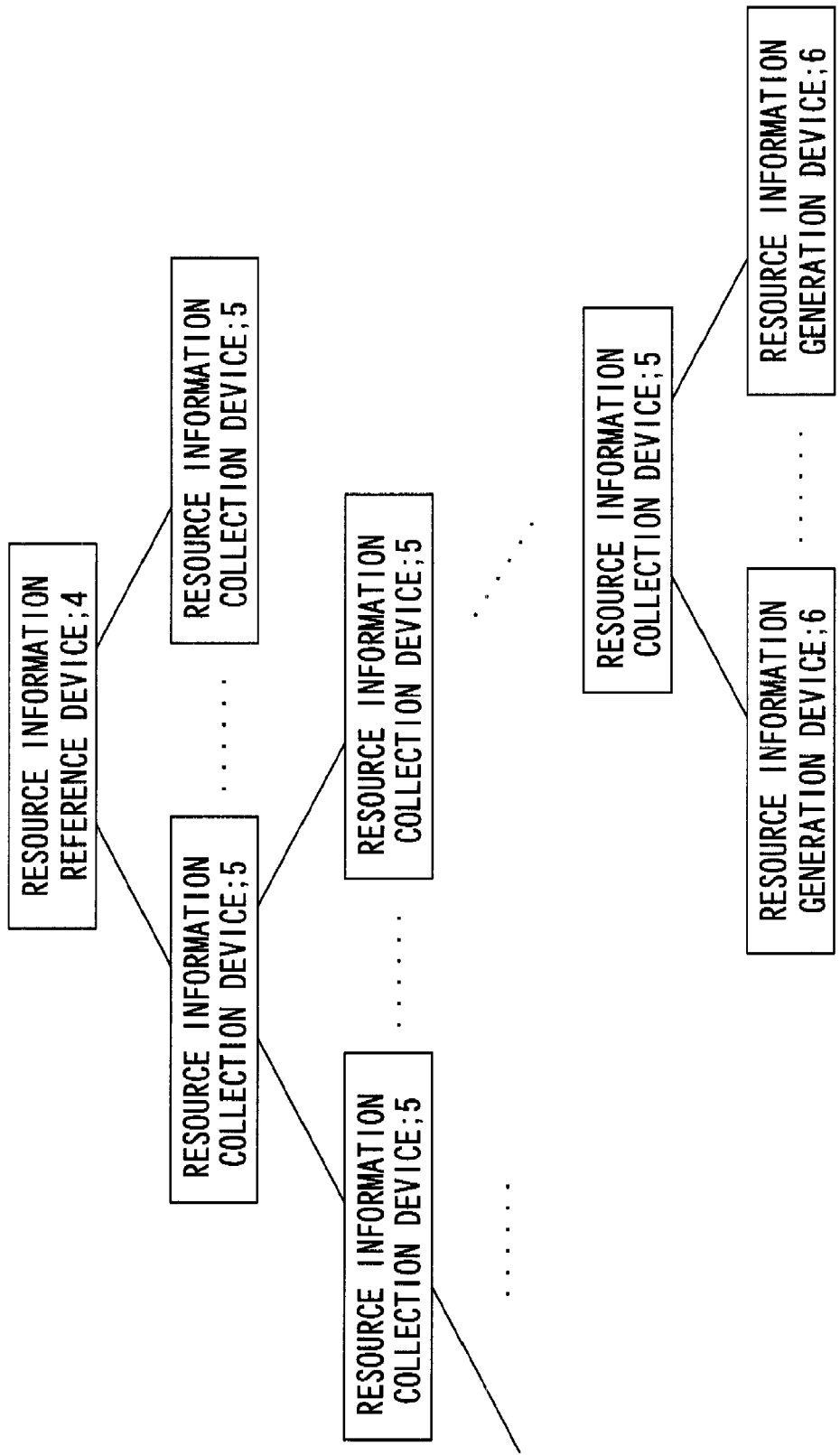
FIG. 10 is a block diagram schematically showing the tree-type connection configuration of resource information collection devices in the resource information management system in the second exemplary embodiment of the present invention.
Figure 11:
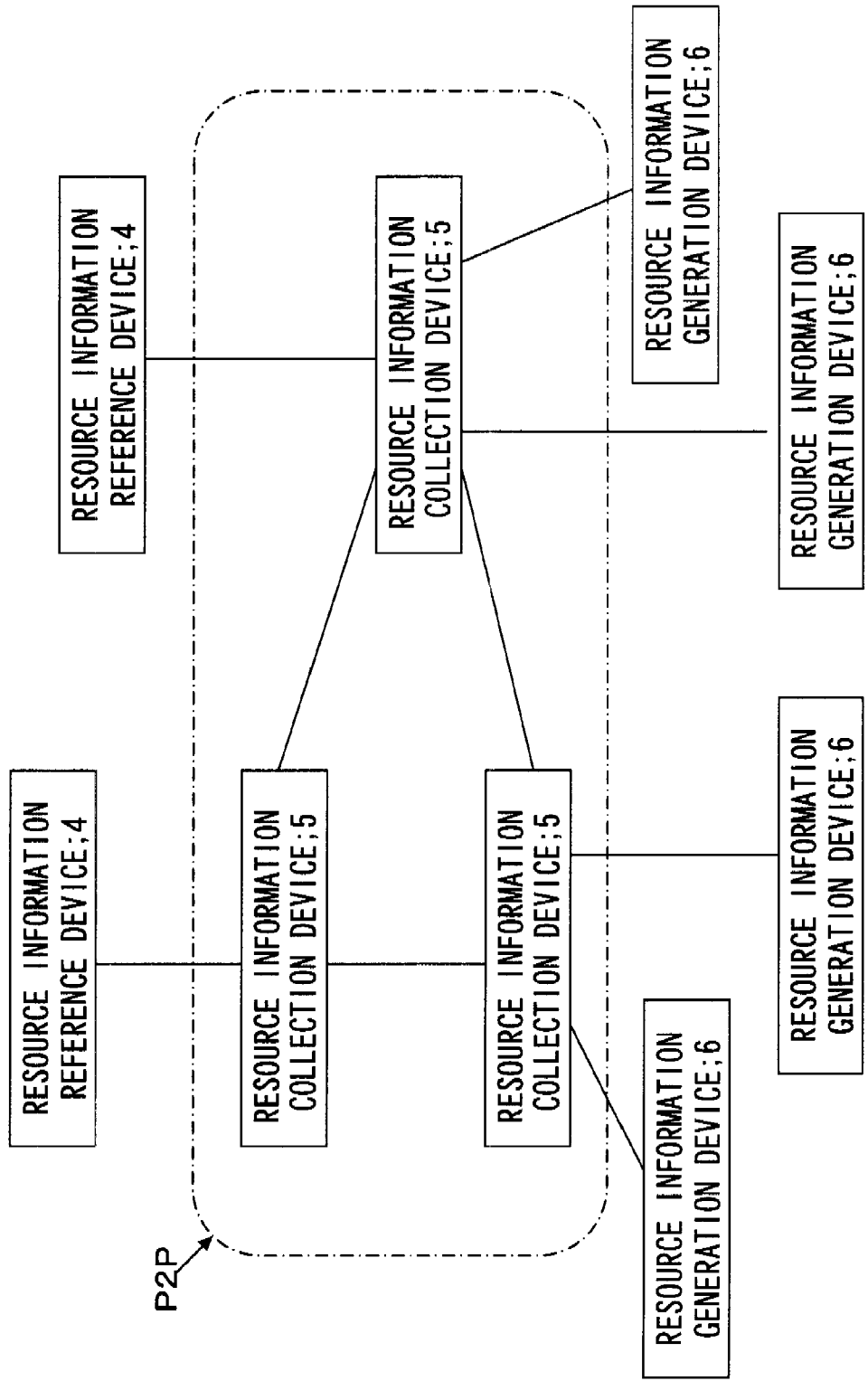
FIG. 11 is a block diagram schematically showing the P2P-type connection configuration of resource information collection devices in the resource information management system in the second exemplary embodiment of the present invention.

Next, a resource information management system in a second exemplary embodiment of the present invention will be described with reference to the drawings. FIG. 8 is a block diagram schematically showing the configuration of the resource information management system in the second exemplary embodiment of the present invention. FIGS. 9-11 are block diagrams schematically showing examples of the connection of resource information collection devices in the resource information management system in the second exemplary embodiment of the present invention.

Referring to FIG. 8, the resource information management system in the second exemplary embodiment has the configuration similar to the configuration of the first exemplary embodiment (see FIG. 1) except that another resource information collection device 7 is added which collects resource information from a resource information collection device 5 and provides the collected information to a resource information reference device 4.

The configuration of the resource information collection device 7 is the same as that of the resource information collection device 5. In addition to the configuration of connection between the resource information collection device 5 and the resource information collection device 7, a series type connection configuration shown in FIG. 9, a tree type connection configuration shown in FIG. 10, and a P2P type connection configuration shown in FIG. 11 are possible. Because all connection configurations are considered an extension (or expansion) of the configuration shown in FIG. 8, the following describes the configuration in FIG. 8 in detail. The resource information collection device 5 collects resource information from multiple resource information generation devices 6 via a network 10, determines whether the times are synchronized and, if they are not synchronized, corrects the generation time in the resource information and stores the resource information in an information storage unit 51. On the other hand, the resource information collection device 7 collects resource information from the resource information collection device 5 via a network 11, determines whether the times are synchronized and, if they are not synchronized, corrects the generation time in the resource information and stores the resource information in an information storage unit 71.

Next, the following describes the operation of the resource information management system in the second exemplary embodiment of the present invention. The operation between the resource information collection device 5 and the resource information generation device 6 is the same as that in the first exemplary embodiment (FIGS. 2 to 4). The operation between the resource information reference device 4 and the resource information collection device 7 is the same as that in the first exemplary embodiment (FIGS. 5-7). The following describes the operation between the resource information collection device 7 and the resource information collection device 5.

Figure 12:
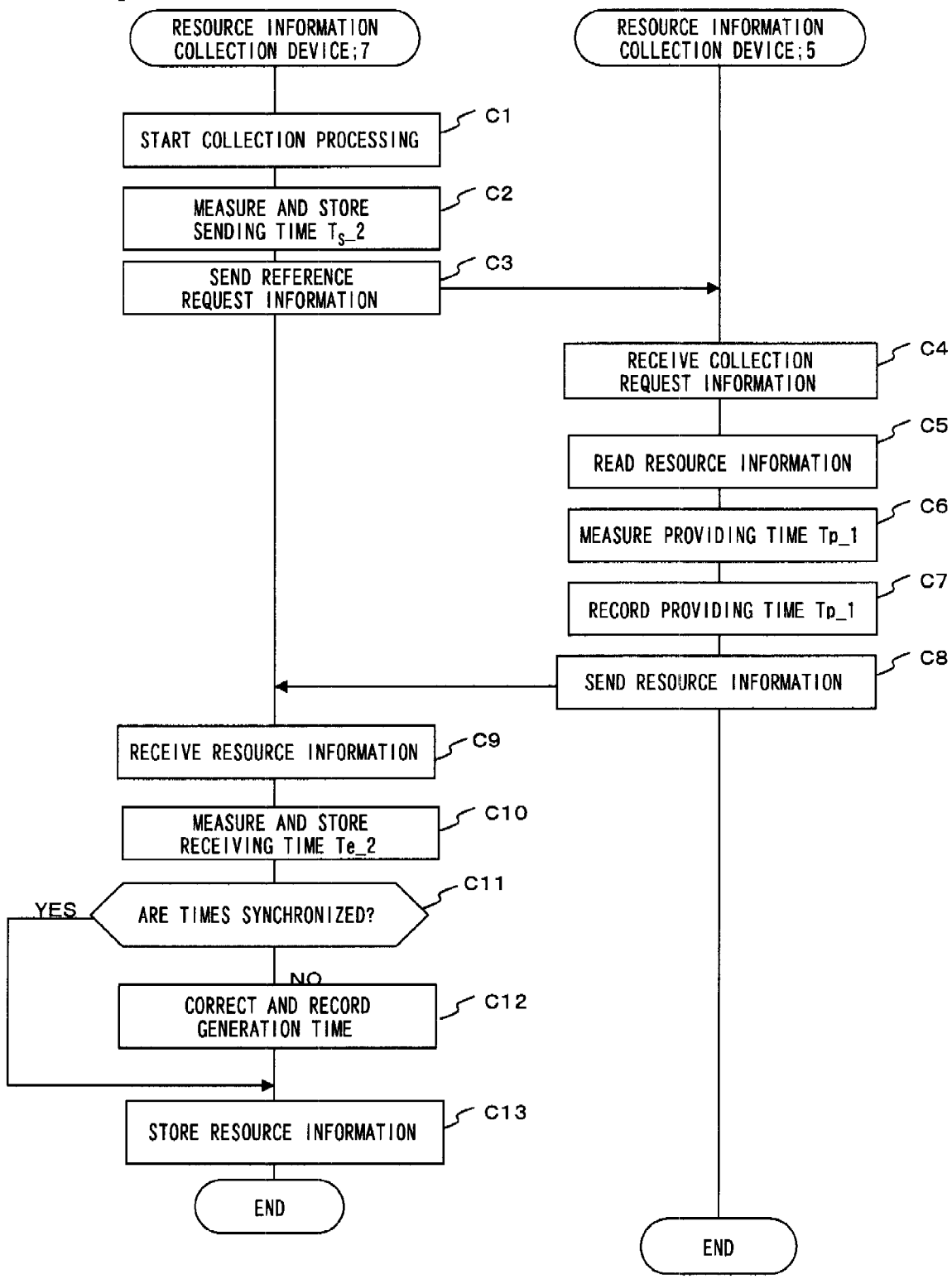
FIG. 12 is a flowchart schematically showing one example of operation performed between two resource information collection devices of the resource information management system in the second exemplary embodiment of the present invention.
Figure 13:
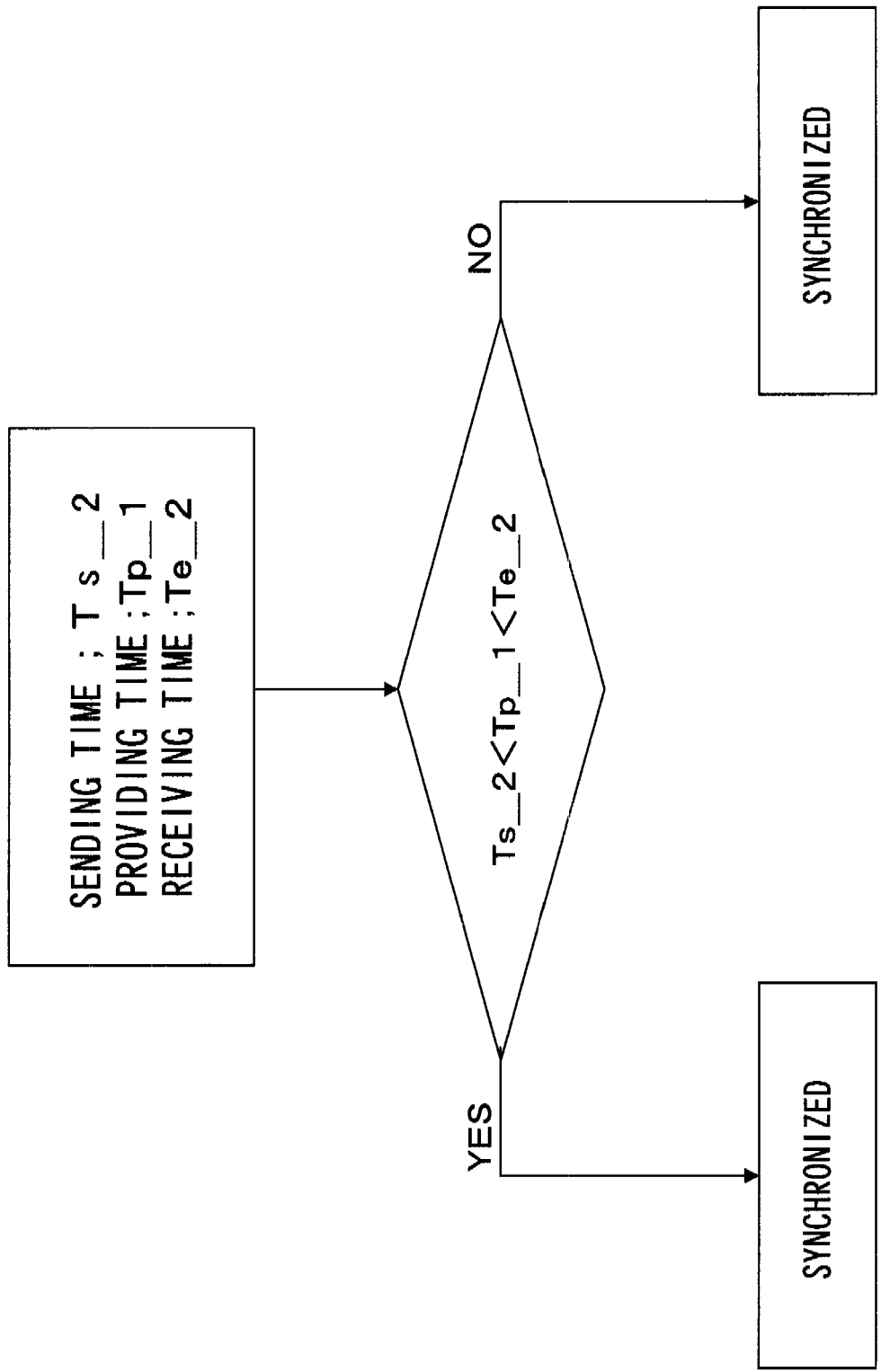
FIG. 13 is flowchart schematically showing one example of synchronization determination processing of the resource information collection device (7) in the resource information management system in the second exemplary embodiment of the present invention.
Figure 14:
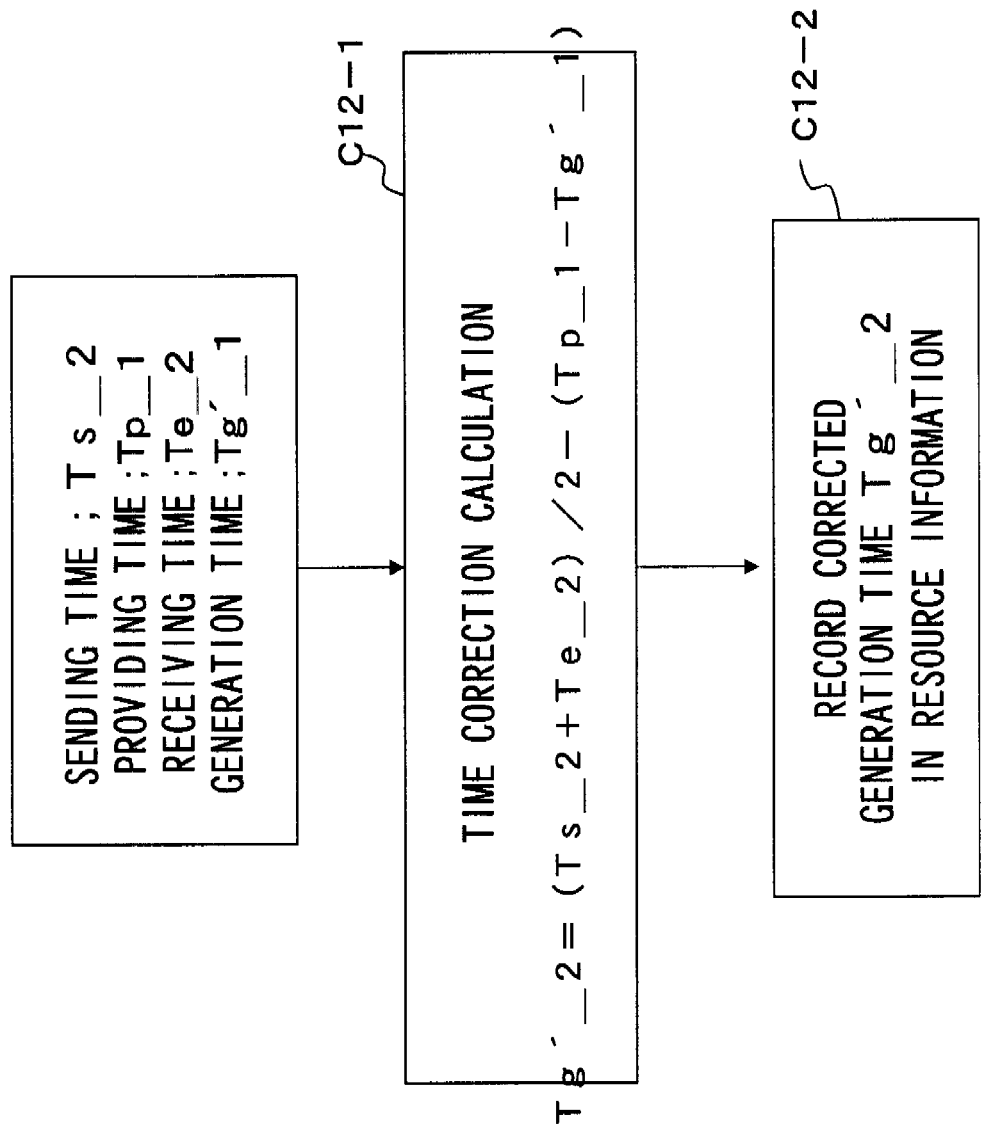
FIG. 14 is a flowchart schematically showing one example of time correction processing of the resource information collection device (7) in the resource information management system in the second exemplary embodiment of the present invention.

FIG. 12 is a flowchart schematically showing one example of the operation performed between two resource information collection devices of the resource information management system in the second exemplary embodiment of the present invention. FIG. 13 is flowchart schematically showing one example of the synchronization determination processing of the resource information collection device 7 in the resource information management system in the second exemplary embodiment of the present invention. FIG. 14 is a flowchart schematically showing one example of the time correction processing of the resource information collection device 7 in the resource information management system in the second exemplary embodiment of the present invention. For the configuration of the resource information collection device 5 and the resource information collection device 7, see FIG. 8. FIG. 12 shows the processing performed between one resource information collection device 7 and one resource information collection device 5. The information reference processing is performed according to the procedure similar to the basic flow of the information collection processing shown in FIG. 2.

First, when information collection processing is started periodically or when a collection request is issued from a manager or a program 2, the resource information collection device 7 starts the collection processing (step C1). Next, the resource information collection device 7 causes a clocking unit 73 to measure the sending time Ts_2 immediately before the collection request information is sent to the resource information collection device 5 (deemed sending time) and stores the measured sending time Ts_2 (step C2). Next, the resource information collection device 7 sends the collection request information to the resource information collection device 5 (step C3).

Next, the resource information collection device 5 receives the collection request information from the resource information collection device 7 (step C4). Next, the resource information collection device 5 reads the resource information corresponding to the collection request information from the information storage unit 51 (step C5). Next, the resource information collection device 5 causes the clocking unit 53 to measure the providing time Tp_1 that is the time immediately before the resource information that has been read is provided (deemed providing time) (step C6). Next, the resource information collection device 5 records the measured providing time Tp_1 in the resource information (step C7). Next, the resource information collection device 5 sends the resource information to the resource information collection device 7 (step C8).

Next, the resource information collection device 7 receives the resource information from the resource information collection device 5 (step C9). Next, the resource information collection device 7 measures the receiving time Te_2 that is the time immediately after the resource information is received (deemed receiving time) and stores the receiving time Te_2 (step C10).

Next, the resource information collection device 7 determines if the time is synchronized between the resource information collection device 7 and the resource information collection device 5 based on the sending time Ts_2 and the receiving time Te_2 that are stored and the providing time Tp_1 that is included in the resource information (step C11). The time synchronization determination processing is performed by determining if the providing time Tp_1 stored in the resource information is between the sending time Ts_2 and the receiving time Te_2 (see FIG. 13).

If they are not synchronized (NO in step C11), the resource information collection device 7 corrects the generation time Tg'_1 (step C12). FIG. 14 shows the time correction in which the period (length) of time from the time the resource 3 itself was generated to the time the resource information was provided is calculated as "Tp_1−Tg'_1", where Tg'_1 is the resource information generation time recorded in the resource information collection device 5, and the time that is by "Tp_1−Tg'_1" earlier than the estimated providing time of the resource information collection device 7 (intermediate time of Ts_2 and Te_2 in this case) is set to the generation time Tg'_2 (step C12-1). The calculated corrected generation time Tg'_2 is recorded in the resource information (step C12-2). Meanwhile, the corrected generation time Tg' in the resource information is used for the generation time Tg'_1, the generation time Tg is used when Tg' is not included in the resource information, and the providing time Tp is used when Tg is not included in the resource information.

If the times are synchronized or after step C12 is finished, the resource information collection device 7 stores the information in the information storage unit 71 (step C13) and terminates the processing.

Even if there is a time difference between the resource information collection device 7 and the resource information collection device 5, the above-described configuration allows resource information reference device 4 to reference the generation time of all resource information according to the time of the resource information collection device 7 and to chronologically keep track of the distributed resource information.

Because the second exemplary embodiment allows the resource information reference device and all resource information collection devices to estimate and correct the generation time of the resource information according to the time of the device, the resource information reference device 4 can acquire all resource information chronologically even when there is a time difference between devices.

In addition, instead of managing the time difference among devices as an offset, the time is measured at collection time and the information generation time is corrected only when the correction is required. So, even if the offset value is changed as a result of time synchronization or correction, there is no problem that data generated after a change is corrected by an incorrect offset value. Nor is there a need for the resource information collection device 7 to manage time differences from those of the resource information generation device 6.

In addition, because the resource information collection device chronologically manages information without depending on the times of other devices, the resource information collection devices can be configured in a series type connection configuration, a tree type connection configuration, and a P2P type connection configuration for managing information on a larger number of resource information generation devices.

In addition, the similar time correction, if performed between information collection devices or between the information reference device and the information collection device, allows chronological information to be acquired based on the time of the information collection device regardless of which resource information collection device collects information on which managed object, making this exemplary embodiment applicable to a large-scale system having many managed objects.

(Third Exemplary Embodiment)

Figure 15:
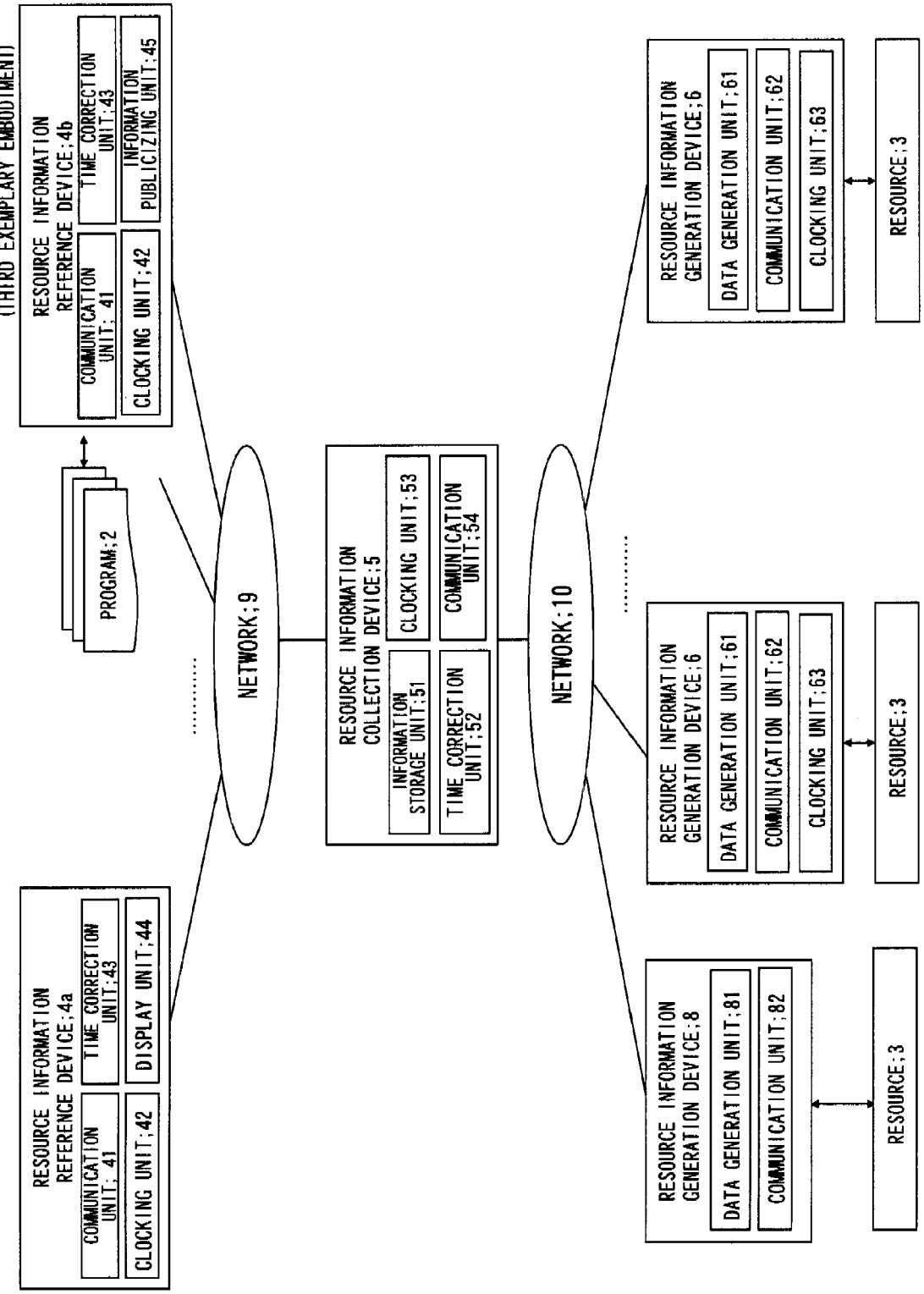
FIG. 15 is a block diagram schematically showing the configuration of a resource information management system in a third exemplary embodiment of the present invention.

Next, a resource information management system in a third exemplary embodiment of the present invention will be described in detailed with reference to the drawings. FIG. 15 is a block diagram schematically showing the configuration of the resource information management system in the third exemplary embodiment of the present invention.

In the resource information management system in the third exemplary embodiment, one (or all) of the resource information generation device (6 in FIG. 1) in the first exemplary embodiment is replaced by a resource information generation device 8.

The resource information generation device 8 connects to a resource 3 when a resource information collection device 5 issues a resource information request to the resource information generation device 8, and causes a data generation unit 81 to generate resource information. The generated data is sent to a resource information collection device 5 by a communication unit 82. At this time, because the resource information generation device 8 has no clocking unit (63 in FIG. 1), the generation time and the providing time are not included in the data. Typically, this resource information generation device is an information apparatus with no clocking function, such as an RFID or an IC chip.

Figure 16:
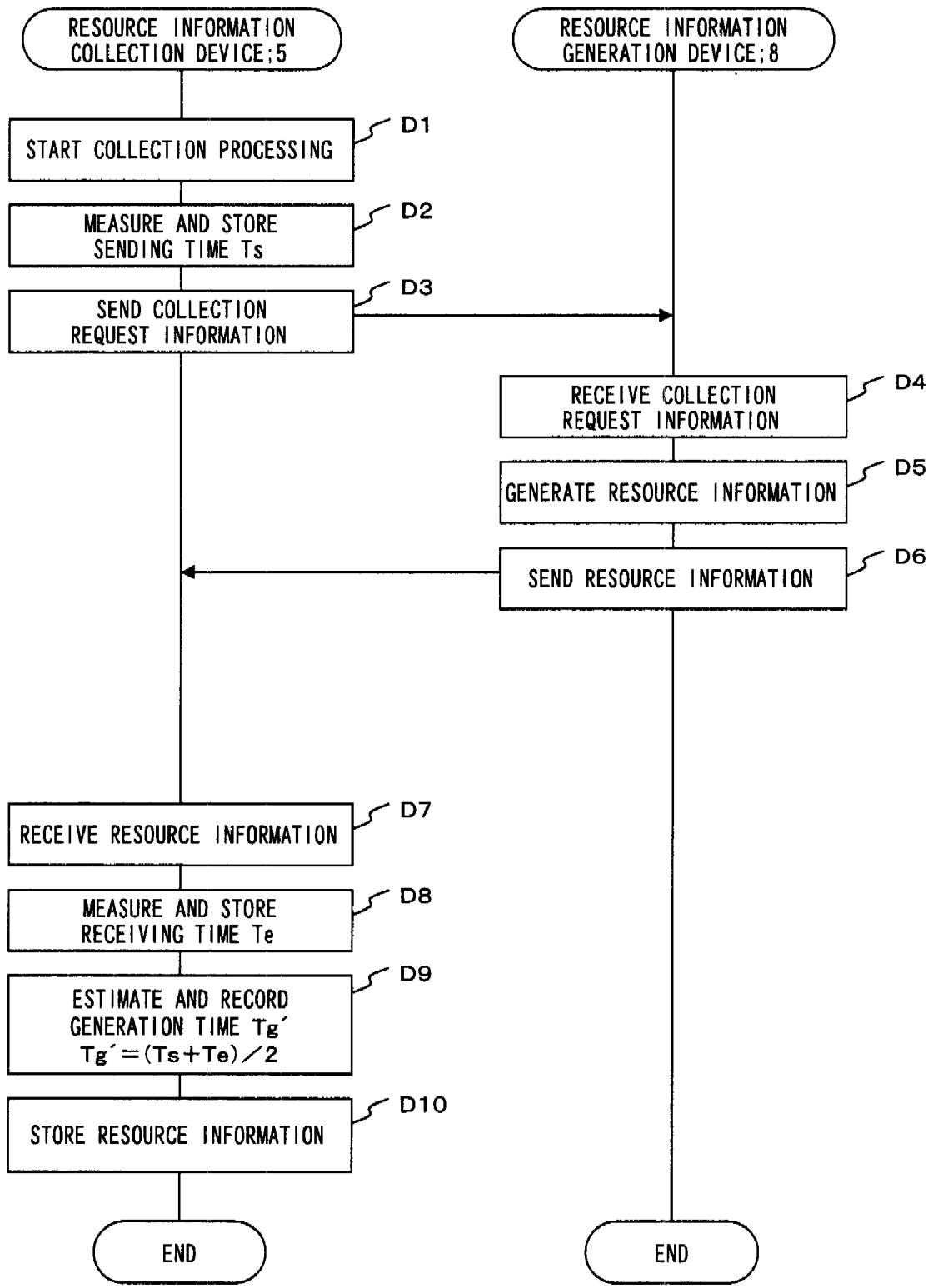
FIG. 16 is a flowchart schematically showing one example of information collection processing performed between a resource information collection device and a resource information generation device in the resource information management system in the third exemplary embodiment of the present invention.

Next, the following describes the operation of the resource information management system in the third exemplary embodiment of the present invention. The following describes the basic flow of information collection processing, which is performed between one resource information collection device 5 and one resource information generation device 8, with reference to the drawings. FIG. 16 is a flowchart schematically showing one example of information collection processing that is performed between the resource information collection device and the resource information generation device in the resource information management system in the third exemplary embodiment of the present invention. Note that the processing is performed according to the flow in FIG. 16 also when there are multiple resource information generation devices 8 or multiple resource information collection devices 5.

First, when information collection processing is started periodically or when a reference request is issued from a manager or a program 2, the resource information collection device 5 starts the collection processing (step D1). Next, the resource information collection device 5 causes a clocking unit 53 to measure the sending time Ts immediately before the collection request information is sent from [sic. to] the resource information generation device 8 (deemed sending time) and stores the measured sending time Ts (step D2). Next, the resource information collection device 5 sends the collection request information to the resource information generation device 8 (step D3).

Next, the resource information generation device 8 receives the collection request information from the resource information collection device 5 (step D4). Next, the resource information generation device 8 causes the data generation unit 81 to access the resource 3 of the managed object, reads the code of the resource 3 such as the configuration information and status information, and generates the resource information, which has been converted to data, based on the code that has been read (step D5). Next, the resource information generation device 8 sends the generated resource information to the resource information collection device 5 (step D6).

Next, the resource information collection device 5 receives the resource information from the resource information generation device 8 (step D7). Next, the resource information collection device 5 causes the clocking unit 53 to measure the receiving time Te that is the time immediately after the resource information is received (deemed receiving time) and stores the receiving time Te (step D8). Next, based on the stored sending time Ts and receiving time Te, the resource information collection device 5 causes a time correction unit 52 to estimate the generation time Tg' of the collected resource information as an intermediate value of Ts and Te, and records the generation time Tg' in the resource information (step D9). Next, the resource information collection device 5 stores the resource information in the information storage unit 51 (step D10).

The operation is based on the flowchart shown in FIG. 2 when resource information is collected from a resource information generation device (6 in FIG. 1) that has the clocking unit (63 in FIG. 1). The data can be managed with the time, estimated in this way, as the generation time.

The third exemplary embodiment allows a resource information reference device 4 to acquire all resource information chronologically because the resource information collection device 5 estimates the generation time and records it in the resource information even in a status in which the resource information generation device 8 having no the clocking unit is mixed with other resource information generation devices. Especially, in managing performance information, status information, and configuration information that change in real time, this exemplary embodiment is efficient as a method for including a generation time in the information.

EXAMPLES

First Example

Figure 17:
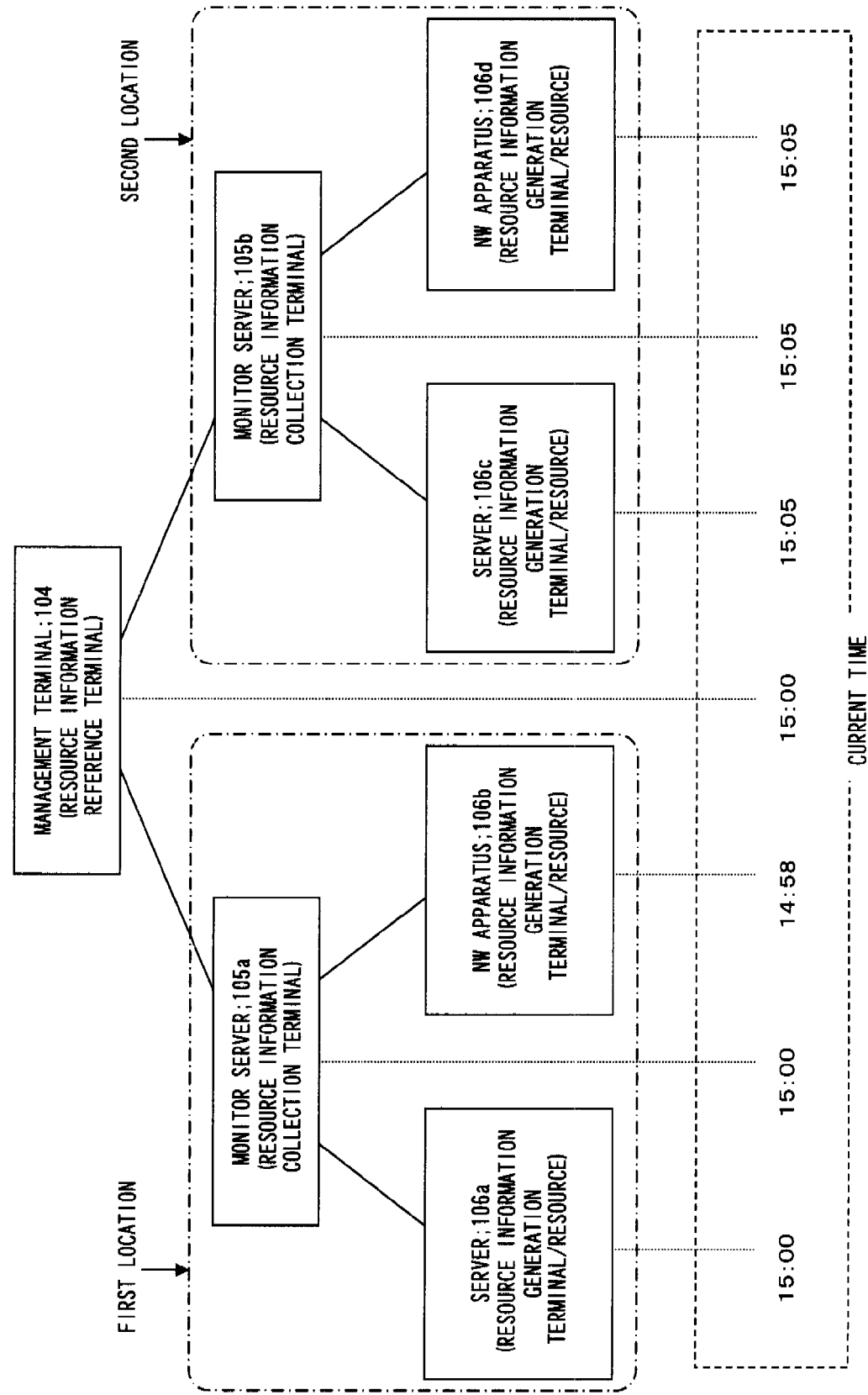
FIG. 17 is a block diagram schematically showing the configuration of a resource information management system in a first example of the present invention.

Next, a first example of the present invention will be described with reference to the drawings. FIG. 17 is a block diagram schematically showing the configuration of a resource information management system in the first example of the present invention.

Assume that a business enterprise having multiple locations integrally monitors the configuration and performance information on the systems in the locations. In the first location, a monitor server 105a that is a resource information collection device is connected to a server 106a and a network apparatus (NW apparatus) 106b that are resource information generation devices (including resources). In the second location, a monitor server 105b that is a resource information collection device is connected to a server 106c and a server 106d that are resource information generation devices (including resources). The monitor servers 105a and 105b in the locations are connected to a management terminal 104 that is a resource information reference device. On the management terminal 104, the manager references the Web browser screen to monitor the status of the resources (resources included in the servers 106a, 106c, 106d and network apparatus 106b). Assume that the current times of the apparatuses, servers, and terminals are different as shown in FIG. 17, that is, the current time of the server 106a is 15:00, the current time of the monitor server 105a is 15:00, the current time of the NW apparatus 106b is 14:58, the current time of the management terminal 104 is 15:00, the current time of the server 106c is 15:05, the current time of the monitor server 105b is 15:05, and the current time of the server 106d is 15:05.

Assume that the processing is performed according to the following procedure at the following times, as measured by the clock of the management terminal 104, as shown in FIG. 18: that is, the monitor server 105a collects resource information on the server 106a at 15:01, the monitor server 105a collects resource information on the NW apparatus 106b at 15:02, the monitor server 105b collects resource information on the server 106c at 15:03, the monitor server 105b collects resource information on the server 106d at 15:04, and the management terminal 104 references resource information, collected in the monitor servers 105a and 105b, at 15:05.

Also assume that all resource information is converted to data when referenced. Under this assumption, the chronological data (expected data) that is expected when the management terminal 104 references the monitor servers 105a and 105b is as shown in FIG. 19: that is, latest resource information on the server 106a at 15:01, latest resource information on the NW apparatus 106b at 15:02, latest resource information on the server 106c at 15:03, and latest resource information on the server 106d at 15:04.

Note that, because the NW apparatus 106b and servers 106c and 106d, whose current times are different from that of the management terminal 104, record inconsistent providing times Tp in the resource information, the recorded providing times must be corrected to produce the correct chronological times. More specifically, the providing times Tp of the resource information recorded according to the procedure shown in FIG. 18 should be as shown in FIG. 20 if time correction is not performed: that is, latest resource information on server 106a at 15:01, latest resource information on NW apparatus 106b at 15:00, latest resource information on server 106c at 15:08, and latest resource information on server 106d at 15:09. This result is different greatly from the expected data (see FIG. 19). In particular, the reversed order of the latest resource information on the server 106a and the latest resource information on the NW apparatus 106b makes it difficult to analyze the causality (cause and effect) relation.

To solve this problem, the time correction is performed based on the flowcharts in FIG. 2, FIG. 3, and FIG. 4 shown in the first exemplary embodiment of the present invention. The result of the time correction performed by the monitor servers 105a and 105b is as shown in FIG. 21. In the monitor server 105a, the time of the latest resource information on the server 106a is 15:01 and the time of the latest resource information on the NW apparatus 106b is 15:02; in the monitor server 105b, the time of the latest resource information on the server 106c is 15:08 and the time of the latest resource information on the server 106d is 15:09. Note it is assumed that it takes about one second for the collection and that the times are corrected with sufficient accuracy.

The result indicates that the generation time of the resource information on the NW apparatus 106b is corrected and, as a result, the order has become correct. In this case, though the information collected by the monitor server 105b is different from the result in FIG. 19, the processing of the flowchart in FIG. 5, shown in the first exemplary embodiment of the present invention, is performed when the management terminal 104 references the resource information and, so, the time is further corrected.

Finally, the manager on the management terminal 104 can acquire the chronological data shown in FIG. 21. In this way, even if the times are different among resource information providing apparatuses and collecting apparatuses, the chronological data can be acquired without changing the times in those apparatuses.

The monitor server 105a can measure a time difference from the NW apparatus 106b in advance and manage the time difference as an offset for performing the similar correction processing. However, because there is no guarantee that the time of the system that references the resource information is always the same time as that of the monitor server 105a, the time correction of the resource information reference device of the present invention is necessary.

The method for managing an offset has another problem when the system time is changed. To point out this problem, let's consider the case in FIG. 22 (comparison example 1) in which one hour has passed since the status in FIG. 17.

Figure 22:
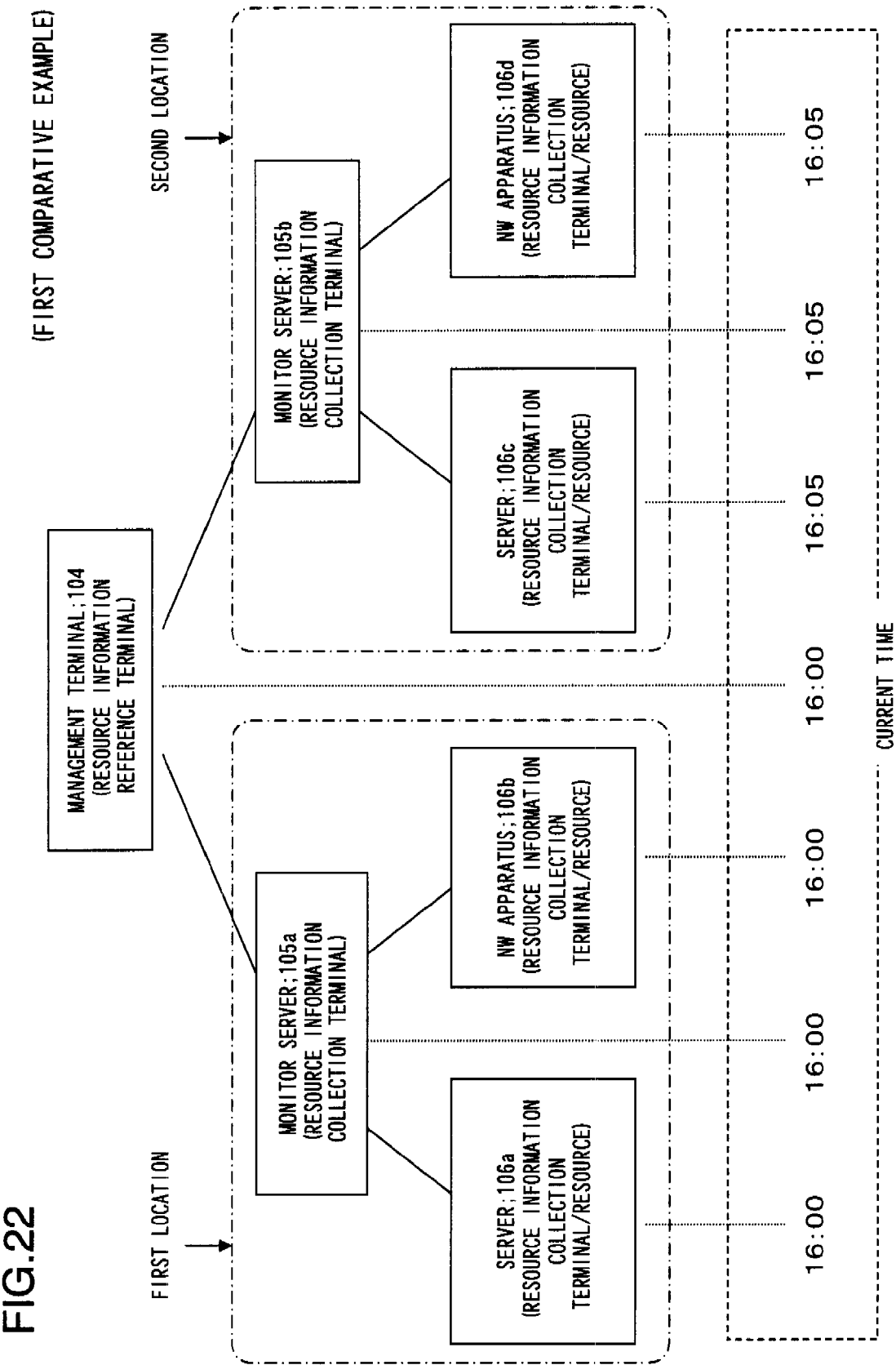
FIG. 22 is a block diagram schematically showing the configuration of a resource information management system (with offset management) in a first comparison example.

Assume that, in the time period of one hour, another manager (for example, network manager) detects a difference in the system time and corrects the time. At this time, the time synchronization is established between the monitor server 105a and the server 106a and the NW apparatus 106b, which are managed objects, as shown in FIG. 22.

Assume that the processing is performed according to the following procedure at the following times, as measured by the clock of the management terminal 104, as shown in FIG. 23: that is, the monitor server 105a collects resource information on the server 106a at 16:01, the monitor server 105a collects resource information on the NW apparatus 106b at 16:02, the monitor server 105b collects resource information on the server 106c at 16:03, the monitor server 105b collects resource information on the server 106d at 16:04, and the management terminal 104 references resource information, collected in the monitor servers 105a and 105b, at 16:05.

At this time, the chronological data (expected data) that is expected when the manager uses the management terminal 104 to reference resource information is as shown in FIG. 24: that is, latest resource information on the server 106a at 16:01, latest resource information on the NW apparatus 106b at 16:02, latest resource information on the server 106c at 16:03, and latest resource information on the server 106d at 16:04.

If the monitor server 105a corrects the time using an offset and the offset value "−0:02" of the monitor server 105a for the NW apparatus 106b at 15:00 is not updated, the monitor server 105a incorrectly corrects the generation time of the resource information on the NW apparatus 106b. The result is as shown in FIG. 25, that is, the latest resource information on the server 106a is 16:01 and the latest resource information on the NW apparatus 106b is 16:00.

In contrast, when the present invention is used, it is determined that there is no time difference and so no correction is made. The present invention allows a generation time to be corrected without depending upon a change in an offset value even if there is no way to know when and why the offset value will be changed.

INDUSTRIAL APPLICABILITY

In a system where many information apparatuses that are not time-synchronized are connected via a network, the present invention is applicable to a program for implementing, in a computer, a device that identifies the cause of a failure or a load variation or a device that identifies the cause.

In addition, in a system where many information apparatuses that are not time-synchronized are connected via a network, the present invention is applicable to a program for implementing, in a computer, a device that monitors the load status or configuration status of the whole system and predicts a load or an abnormal condition in advance which will occur in the system or a device that makes a prediction.

The exemplary embodiments and the example may be changed and adjusted in the scope of all disclosures (including claims), and based on the basic technological concept, of the present invention. In the scope of the claims of the present invention, various disclosed elements may be combined and selected in a variety of ways

What is claimed is:

1. A resource information management device comprising:
a time correction unit that confirms time synchronization with a predetermined device, when resource information from the predetermined device is collected or referenced, and if time synchronization is not established, records in the resource information a generation time, corrected based on a current time of the resource information management device and a current time measured by the predetermined device; and
a clocking unit that measures a sending time when request information, which requests said predetermined device to send resource information, is sent, and measures a receiving time when resource information from said predetermined device is received,
wherein the resource information comprises the time measured by the predetermined device,
wherein the current time of the resource information management device is a current time measured by the resource information management device when the resource information is collected or referenced, and
wherein the resource information management device is implemented in a hardware device, and
wherein said predetermined device is a device that has a clocking function and, at the same time, generates or collects resource information, and
wherein said time correction unit is configured to:
determine if time synchronization is established with said predetermined device when the resource information includes a providing time of said predetermined device, using the sending time, the receiving time, and the providing time;
calculate a corrected generation time, if synchronization is not established and a generation time is included in the resource information, by subtracting a time, elapsed from the generation time to the providing time, from a middle value between the sending time and the receiving time; and
record the corrected generation time in the resource information.

2. The resource information management device as defined in claim 1, wherein
said time correction unit is configured to:
determine if time synchronization is established with said predetermined device when the resource information includes the providing time of said predetermined device, using the sending time, the receiving time, and the providing time;
calculate a corrected generation time as an intermediate value between the sending time and the receiving time if synchronization is not established and the generation time is not included in the resource information; and
record the corrected generation time in the resource information.

3. The resource information management device as defined in claim 1, wherein said predetermined device is a resource information generation device that does not have a clocking function.

4. The resource information management device as defined in claim 3, further comprising:
a clocking unit that measures a sending time when request information, which requests said predetermined device to send resource information, is sent, and measures a receiving time when resource information from said predetermined device is received;
wherein said time correction unit calculates a corrected generation time as an intermediate value between the sending time and the receiving time if the resource information does not include a providing time of said predetermined device, and
records the corrected generation time in the resource information.

5. A resource information management system comprising:
one or more resources each including code;
one or more resource information generation devices each of which generates resource information generated by converting the code to data;
one or more resource information collection devices each of which collects the resource information from said resource information generation device; and
a resource information reference device that references the resource information from said resource information collection device; wherein said resource information collection device comprises a first time correction unit that confirms time synchronization with said resource information generation device, when resource information from said resource information generation device is collected and, if synchronization is not established, records in the resource information a first generation time that is corrected based on a current time of the resource information collection device and a current time of the resource information generation device, and said resource information reference device comprises a second time correction unit that confirms time synchronization with said resource information collection device, when resource information from said resource information collection device is collected, and if synchronization is not established, records in the resource information a second generation time that is corrected based on a current time of the resource information reference device and the current time measured by said resource information collection device, wherein the resource information comprises the current time measured by said resource information generation device and the current time measured by said resource information collection device, wherein the current time measured by said resource information generation device is measured when the resource information is collected;

wherein the current time measured by said resource information collection device is measured by when the resource information is collected;

wherein the resource information collection device is implemented in a first hardware device, wherein the resource information generation device is implemented in a second hardware device, and wherein the resource information reference device is implemented in a third hardware device.

6. The resource information management system as defined in claim 5, wherein said resource information collection devices comprise:
a first resource information collection device and a second resource information collection device;
a first time correction unit of said first resource information collection device confirming time synchronization with said second resource information collection device when resource information is collected from said second resource information collection device, and, if time synchronization is not established, recording a third generation time, corrected based on a time of the first resource information collection device, in the resource information.

7. The resource information management system as defined in claim 5 wherein said resource information generation devices comprise one or both of a first resource information generation device that has a clocking function and a second resource information generation device that has no clocking function.

8. A resource information management method that manages resource information using a resource information management device comprising:

confirming time synchronization with a predetermined device when resource information from said predetermined device is collected or referenced;
recording in the resource information a generation time that is corrected based on a current time of a collecting or referencing device and the current time of said predetermined device, if synchronization is not established;
measuring a sending time when request information, which requests said predetermined device to send resource information, is sent;
sending the request information; and
measuring a receiving time when resource information is received from said predetermined device,
wherein the resource information comprises the current time measured by said predetermined device,
wherein said current time of the collecting or referencing device is a current time measured by the collecting or referencing device when said resource information is collected or referenced,
wherein, in said confirming time synchronization, if the resource information includes a providing time of said predetermined device, it is determined if time synchronization with said predetermined device is established using the sending time, the receiving time, and the providing time and
wherein said recording a generation time in the resource information comprises:
a calculating a corrected generation time, if time synchronization is not established and the resource information includes a generation time, by subtracting a time, elapsed from the generation time to the providing time, from a middle value between the sending time and the receiving time and
recording the corrected generation time in the resource information.

9. The resource information management method as defined in claim 8, wherein in said confirming time synchronization, if the resource information includes a providing time of said predetermined device, it is determined if time synchronization with said predetermined device is established using the sending time, the receiving time, and the providing time; and
said recording a generation time in the resource information comprises:
calculating a corrected generation time as an intermediate value between the sending time and the receiving time if time synchronization is not established and the resource information does not includes a generation time; and
recording the corrected generation time in the resource information.

10. The resource information management method as defined in claim 8, further comprising:
measuring a sending time when request information, which requests said predetermined device to send resource information, is sent;
sending the request information; and
measuring a receiving time when resource information from said predetermined device is received;
wherein said recording a generation time in the resource information comprises:
calculating a corrected generation time as an intermediate value between the sending time and the receiving time if the resource information does not include a providing time of said predetermined device; and
recording the corrected generation time in the resource information.

11. A resource information management program recorded on a non-transient computer-readable recording medium that causes a resource information management device, which manages resource information, to perform:
a process of confirming time synchronization with a predetermined device when resource information from said predetermined device is collected or referenced;

a process of recording in the resource information a generation time that is corrected based on a current time of a collecting or referencing device and a current time measured by said predetermined device, if synchronization is not established;

a process of measuring a sending time when request information, which requests said predetermined device to send resource information, is sent; and a process of measuring a receiving time when resource information from said predetermined device is received, wherein the resource information comprises the current time measured by said predetermined device, wherein said current time of the collecting or referencing device is a current time measured by the collecting or referencing device when said resource information is collected or referenced, and wherein, in said process of confirming time synchronization, if the resource information includes a providing time of said predetermined device, said resource information management device is caused to determine if time synchronization with said predetermined device is established using the sending time, the receiving time, and the providing time and wherein, in said process of recording a generation time in the resource information, said resource information management device is caused to perform:

a process of calculating a corrected generation time, if time synchronization is not established and the resource information includes a generation time, by subtracting a time, elapsed from the generation time to the providing time, from a middle value between the sending time and the receiving time and a process of recording the corrected generation time in the resource information.

12. The resource information management program as defined in claim 11, wherein in said process of confirming time synchronization, if the resource information includes a providing time of said predetermined device, said resource information management device is caused to determine if time synchronization with said predetermined device is established using the sending time, the receiving time, and the providing time; and in said process of recording a generation time in the resource information said resource information management device is caused to perform:

a process of calculating a corrected generation time as an intermediate value between the sending time and the receiving time if time synchronization is not established and the resource information does not includes a generation time; and a process of recording the corrected generation time in the resource information.

13. The resource information management program as defined in claim 11, further causing said resource information management device to perform:

a process of measuring a sending time when request information, which requests said predetermined device to send resource information, is sent; and a process of measuring a receiving time when resource information from said predetermined device is received;

wherein, in said process of recording a generation time in the resource information, said resource information management device is caused to perform:

a process of calculating a corrected generation time as an intermediate value between the sending time and the receiving time if the resource information does not include a providing time of said predetermined device; and a process of recording the corrected generation time in the resource information.

14. The resource information management program as defined in claim 11, further causing said resource information management device to perform a process of presenting the resource information after the corrected generation time is recorded in the resource information.

15. The resource information management program as defined claim 11, further causing said resource information management device to perform a process of storing the resource information after the corrected generation time is recorded in the resource information.

* * * * *

UNITED STATES PATENT AND TRADEMARK OFFICE
CERTIFICATE OF CORRECTION

| | |
|---|---|
| PATENT NO. | : 8,307,120 B2 |
| APPLICATION NO. | : 12/281971 |
| DATED | : November 6, 2012 |
| INVENTOR(S) | : Fumio Machida |

It is certified that error appears in the above-identified patent and that said Letters Patent is hereby corrected as shown below:

In the Drawings

Sheet 3 of 25 (Fig. 3), Line 6: Below "NO", delete "SYNCHRONIZED" and insert -- NOT SYNCHRONIZED --

Sheet 6 of 25 (Fig. 6), Line 6: Below "NO", delete "SYNCHRONIZED" and insert -- NOT SYNCHRONIZED --

Sheet 13 of 25 (Fig. 13), Line 6: Below "NO", delete "SYNCHRONIZED" and insert -- NOT SYNCHRONIZED --

In the Specification

Column 23, Line 50: After "ways", insert -- . --

In the Claims

Column 26, Line 18: In Claim 8, delete "time and" and insert -- time; and --

Column 26, Line 26: In Claim 8, delete "time and" and insert -- time; and --

Column 27, Line 24: In Claim 11, delete "time and" and insert -- time; and --

Column 27, Line 34 (Approx.): In Claim 11, delete "time and" and insert -- time; and --

Signed and Sealed this
Fourteenth Day of October, 2014

Michelle K. Lee
*Deputy Director of the United States Patent and Trademark Office*